(12) United States Patent
Lu et al.

(10) Patent No.: US 7,948,980 B2
(45) Date of Patent: May 24, 2011

(54) SUCCINCT REPRESENTATION OF STATIC PACKET CLASSIFIERS

(75) Inventors: Wencheng Lu, Sunnyvale, CA (US); Sartaj Sahni, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 19 days.

(21) Appl. No.: 12/375,623

(22) PCT Filed: Aug. 2, 2007

(86) PCT No.: PCT/US2007/075107
§ 371 (c)(1),
(2), (4) Date: Aug. 27, 2009

(87) PCT Pub. No.: WO2008/017045
PCT Pub. Date: Feb. 7, 2008

(65) Prior Publication Data
US 2010/0034202 A1  Feb. 11, 2010

Related U.S. Application Data

(60) Provisional application No. 60/821,220, filed on Aug. 2, 2006.

(51) Int. Cl.
*H04L 12/56* (2006.01)
(52) U.S. Cl. ......... 370/389; 370/235; 370/401; 709/238
(58) Field of Classification Search .................. None
See application file for complete search history.

(56) References Cited

U.S. PATENT DOCUMENTS

| | | | |
|---|---|---|---|
| 5,995,971 A | 11/1999 | Douceur et al. | |
| 6,041,053 A | 3/2000 | Douceur et al. | |
| 6,341,130 B1 | 1/2002 | Lakshman et al. | |
| 6,587,466 B1 | 7/2003 | Bhattacharya et al. | |
| 6,633,860 B1 | 10/2003 | Afek et al. | |
| 6,691,131 B2 | 2/2004 | Tikkanen et al. | |
| 6,691,171 B1 | 2/2004 | Liao | |
| 6,694,323 B2 | 2/2004 | Bumbulis | |
| 6,697,363 B1 | 2/2004 | Carr | |
| 6,704,313 B1 | 3/2004 | Duret et al. | |
| 6,778,984 B1 | 8/2004 | Lu et al. | |
| 6,804,230 B1 | 10/2004 | Jennings et al. | |

(Continued)

FOREIGN PATENT DOCUMENTS

EP  1049298  11/2000

(Continued)

OTHER PUBLICATIONS

Song, et al., "Shape Shifting Trees fro Faster IP Lookup", IEEE Conference on Network Protocols, pp. 358-367.

(Continued)

*Primary Examiner* — Bob A Phunkulh
(74) *Attorney, Agent, or Firm* — Saliwanchik, Lloyd, and Eisenschenk

(57) ABSTRACT

A computer-implemented method of classifying packets of data transmitted over a data communications network includes providing a memory-storable packet classifier rule defined by a plurality of filters, each filter uniquely corresponding to a one of a plurality of actions to be taken in transmitting the data packets over the data communications network; and classifying a data packet according to the packet classifier rule by generating at least one supernode trie subject to a predetermined constraint for reducing accesses to a memory in which the packet classifier rule is stored. A system including a combination of hardware and software modules is provided for carrying out the method. A computer-readable storage medium is also provided for storing a computer program for carrying out the method.

22 Claims, 20 Drawing Sheets

U.S. PATENT DOCUMENTS

| | | |
|---|---|---|
| 6,850,513 B1 | 2/2005 | Pelissier |
| 6,910,043 B2 | 6/2005 | Iivonen et al. |
| 6,925,085 B1 | 8/2005 | Krishna et al. |
| 6,970,462 B1 | 11/2005 | McRae |
| 6,985,483 B2 | 1/2006 | Mehrotra et al. |
| 6,996,225 B1 | 2/2006 | Bordonaro et al. |
| 7,002,965 B1 | 2/2006 | Cheriton |
| 7,007,101 B1 | 2/2006 | Schwaderer et al. |
| 2003/0123459 A1* | 7/2003 | Liao .............................. 370/401 |
| 2005/0083935 A1 | 4/2005 | Kounavis et al. |
| 2005/0163122 A1 | 7/2005 | Sahni et al. |
| 2005/0254502 A1 | 11/2005 | Choi |

FOREIGN PATENT DOCUMENTS

| | | |
|---|---|---|
| EP | 1128608 | 8/2001 |
| WO | WO 99/66681 | 12/1999 |
| WO | WO-9966681 A | 12/1999 |

OTHER PUBLICATIONS

Lu, et al., "Succinct Representation of Static Packet Classifiers", Dept. of Computer and Information Science and Engineering, Univ. of Florida, pp. 1-37, Jul. 19, 2006.

Rohan Jude Fernandes, "Succince Balanced Binary Tree and Packed Memory Structure", CS 514 Project, 2003, pp. 1-8.

Brodnik, et al., "Neighbours On a Grid", Lulea University, Jul. 1996, pp. 1-12.

Nilsson, "Fast Address Lookup for Internet Routers", Helsinki University of Technology.

Lu et al., "Succint Representation of Static Packet Classifiers," Dept. of Computer and Information Science and Engineering, Jul. 19, 2006, pp. 1-37.

Fernandes, R. J., "Succinct Balanced Binary Tree and Packed Memory Structure," CS 514 Project, 2003, pp. 1-8.

Brodnik, et al., "Neighbors on a Grid," Lulea University, Jul. 1996, pp. 1-12.

Tian et al., "Fast Matching algorithm and conflict Detection for Packet Filter Rules," Comput. Res. Dev., vol. 42, No. 7, pp. 1128-1135, Jul. 2005. (Abstract).

Shieh et al., "Accelerating Network Security Services with Fast Packet Classification," Computer Communications, vol. 27, pp. 1637-1646, 2004.

* cited by examiner (a) SST PARTITIONING (b) SST NODE REPRESENTATION (a) HSST PARTITIONING (b) HSST NODE REPRESENTATION

| FILTER | DEST PREFIX | SOURCE PREFIX | COST |
|--------|-------------|---------------|------|
| F1 | * | 0* | 1 |
| F2 | 0* | 1* | 2 |
| F3 | 000* | 0* | 3 |
| F4 | 10* | 0* | 4 |
| F5 | 11* | 1* | 5 |

AN EXAMPLE OF FIVE DEST-SOURCE FILTERS

| ALGORITHM | MIN | MAX | MEAN | STANDARD DEVIATION |
|---|---|---|---|---|
| EP | 1.00 | 1.67 | 1.27 | 0.20 |
| EPD | 1.00 | 1.33 | 1.10 | 0.15 |
| EE | 1.00 | 1.33 | 1.19 | 0.12 |
| EBO | 1 | 1 | 1 | 0 |
| BFP | 1.33 | 2.00 | 1.53 | 0.25 |
| V3MT | 1.33 | 1.67 | 1.53 | 0.09 |

(a) ACCESSES

| ALGORITHM | MIN | MAX | MEAN | STANDARD DEVIATION |
|---|---|---|---|---|
| EP | 1.10 | 1.50 | 1.34 | 0.11 |
| EPD | 0.87 | 1.30 | 1.02 | 0.14 |
| EE | 1.05 | 1.35 | 1.23 | 0.08 |
| EBO | 1 | 1 | 1 | 0 |
| BFP | 1.31 | 1.79 | 1.61 | 0.15 |
| V3MT | 1.14 | 1.61 | 1.41 | 0.15 |

(b) MEMORY

FIG. 13

| DATABASE | b=72 BITS | | | | | | b=144 BITS | | | | | |
|---|---|---|---|---|---|---|---|---|---|---|---|---|
| | EP | EPD | EE | EBO | BFP | V3MT | EP | EPD | EE | EBO | BFP | V3MT |
| AADS | 102 | 67 | 92 | 68 | 122 | 110 | 86 | 64 | 81 | 71 | 103 | 89 |
| MAEWEST | 167 | 116 | 150 | 113 | 199 | 180 | 141 | 111 | 135 | 128 | 167 | 146 |
| RRC01 | 479 | 326 | 428 | 335 | 578 | 515 | 419 | 405 | 382 | 314 | 488 | 427 |
| RRC04 | 484 | 344 | 452 | 354 | 610 | 544 | 444 | 432 | 404 | 333 | 514 | 452 |
| AS4637 | 721 | 518 | 682 | 520 | 918 | 798 | 677 | 493 | 611 | 507 | 785 | 663 |
| AS1221 | 870 | 620 | 810 | 644 | 1108 | 981 | 823 | 596 | 750 | 635 | 957 | 819 |

FIG. 14

(a) $B = 72$ BITS (a) $B = 144$ BITS

| DATABASE | AADS | MAEWEST | RRC01 | RRC04 | AS4637 | AS1221 |
|---|---|---|---|---|---|---|
| EARLS 12-4-4-8 [E=32] | 163 | 282 | 793 | 844 | 1270 | 1685 |
| BARLS 12-6-6-8 [B=288] | 137 | 214 | 692 | 733 | 1149 | 1380 |

FIG. 16

| DATABASE | b=72 BITS | | | | | | b=144 BITS | | | | | |
|---|---|---|---|---|---|---|---|---|---|---|---|---|
|  | EP | EPO | EE | EBD | BFP | V3MT | EP | EPD | EE | EBD | BFP | V3MT |
| AS1221* | 7 | 6 | 7 | 7 | 8 | 7 | 5 | 4 | 4 | 3 | 6 | 5 |
| AADS | 7 | 5 | 7 | 5 | 9 | 9 | 5 | 4 | 5 | 4 | 6 | 6 |
| MAEWEST | 8 | 5 | 8 | 5 | 9 | 9 | 6 | 4 | 5 | 4 | 7 | 6 |
| RRC01 | 8 | 6 | 8 | 6 | 9 | 10 | 6 | 4 | 5 | 4 | 7 | 7 |
| RRC04 | 8 | 6 | 8 | 6 | 10 | 10 | 6 | 4 | 6 | 4 | 7 | 7 |
| AS4637 | 8 | 6 | 8 | 6 | 10 | 10 | 6 | 5 | 6 | 4 | 7 | 7 |
| AS1221 | 9 | 6 | 9 | 7 | 10 | 11 | 6 | 5 | 6 | 4 | 7 | 7 |

FIG. 17

| ALGORITHM | MIN | MAX | MEAN | STANDARD DEVIATION |
|---|---|---|---|---|
| EP | 1.00 | 1.67 | 1.41 | 0.17 |
| EPO | 0.86 | 1.33 | 1.04 | 0.14 |
| EE | 1.00 | 1.60 | 1.33 | 0.14 |
| EBO | 1 | 1 | 1 | 0 |
| BFP | 1.14 | 2.00 | 1.66 | 0.21 |
| V3MT | 1.00 | 1.80 | 1.63 | 0.21 |

(a) ACCESSES

| ALGORITHM | MIN | MAX | MEAN | STANDARD DEVIATION |
|---|---|---|---|---|
| EP | 1.42 | 2.99 | 2.47 | 0.45 |
| EPO | 0.92 | 1.21 | 0.99 | 0.10 |
| EE | 1.35 | 2.16 | 1.97 | 0.26 |
| EBO | 1 | 1 | 1 | 0 |
| BFP | 1.82 | 3.17 | 2.71 | 0.42 |
| V3MT | 2.26 | 3.12 | 2.79 | 0.30 |

(b) MEMORY

FIG. 19

| DATABASE | b=72 BITS | | | | | | b=144 BITS | | | | | |
|---|---|---|---|---|---|---|---|---|---|---|---|---|
| | EP | EPO | EB | EBO | BFP | V3MT | EP | EPO | EB | EBO | BFP | V3MT |
| AS1221 | 7255 | 4372 | 6574 | 4755 | 8634 | 10996 | 6043 | 4213 | 5760 | 4254 | 7729 | 9601 |
| AADS | 473 | 170 | 391 | 184 | 501 | 558 | 464 | 157 | 334 | 155 | 492 | 438 |
| MAEWEST | 769 | 296 | 641 | 311 | 836 | 946 | 750 | 284 | 563 | 270 | 831 | 724 |
| RRC01 | 2581 | 974 | 2102 | 1046 | 2783 | 3267 | 2556 | 1107 | 1969 | 917 | 2782 | 2405 |
| RRC04 | 2744 | 1030 | 2234 | 1108 | 2969 | 3459 | 2712 | 1163 | 2098 | 971 | 2949 | 2562 |
| AS4637 | 4249 | 1617 | 3449 | 1752 | 4609 | 5445 | 4216 | 1461 | 3201 | 1503 | 4584 | 3957 |
| AS1221 | 5656 | 2182 | 4665 | 2252 | 6240 | 6982 | 5489 | 2005 | 4220 | 2168 | 6090 | 5516 |

FIG. 20

|  | B=72 BITS ||||||  B=144 BITS ||||||
|  | EBD || BFP || V3MT || EBD || BFP || V3MT ||
| DATABASE | MEM | MAs | MEM | MAs | MEM | MAs | MEM | MAs | MEM | MAs | MEM | MAs |
| --- | --- | --- | --- | --- | --- | --- | --- | --- | --- | --- | --- | --- |
| AADS | 51 | 5 | 94 | 7 | 72 | 7 | 50 | 3 | 78 | 6 | 57 | 5 |
| MAEWEST | 85 | 5 | 151 | 7 | 116 | 8 | 89 | 3 | 126 | 6 | 93 | 5 |
| AS1221 | 425 | 6 | 716 | 8 | 507 | 9 | 411 | 4 | 605 | 6 | 418 | 6 |

FIG. 22

|  | B=72 BITS |||| B=144 BITS ||||
|  | 2DHSST || 2DHSSTPC || 2DHSST || 2DHSSTPC ||
| DATA SET | MEM | MAs | MEM | MAs | MEM | MAs | MEM | MAs |
| --- | --- | --- | --- | --- | --- | --- | --- | --- |
| ACL1 | 329 | 9 | 333 | 9 | 479 | 6 | 479 | 6 |
| ACL2 | 256 | 13 | 264 | 12 | 379 | 9 | 388 | 8 |
| ACL3 | 102 | 26 | 119 | 18 | 102 | 16 | 131 | 11 |
| ACL4 | 130 | 34 | 148 | 20 | 131 | 20 | 154 | 12 |
| ACL5 | 40 | 17 | 45 | 16 | 39 | 10 | 50 | 7 |
| FW1 | 236 | 11 | 236 | 11 | 274 | 8 | 274 | 8 |
| FW2 | 261 | 11 | 261 | 11 | 392 | 8 | 390 | 8 |
| FW3 | 210 | 11 | 210 | 11 | 260 | 8 | 260 | 8 |
| FW4 | 203 | 11 | 203 | 11 | 237 | 8 | 237 | 8 |
| FW5 | 216 | 11 | 216 | 11 | 274 | 9 | 273 | 9 |
| IPC1 | 174 | 20 | 190 | 17 | 189 | 12 | 211 | 11 |
| IPC2 | 265 | 10 | 265 | 10 | 300 | 8 | 300 | 8 |

FIG. 23

| DATA SET | MEM | MAs | BITS/RULE |
|---|---|---|---|
| ACL1 | 480 | 6 | 196 |
| ACL2 | 392 | 12 | 169 |
| ACL3 | 181 | 35 | 78 |
| ACL4 | 252 | 32 | 108 |
| ACL5 | 87 | 20 | 59 |
| FW1 | 282 | 8 | 121 |
| FW2 | 391 | 8 | 168 |
| FW3 | 264 | 8 | 120 |
| FW4 | 302 | 9 | 145 |
| FW5 | 280 | 9 | 135 |
| IPC1 | 244 | 23 | 105 |
| IPC2 | 326 | 8 | 133 |

| DATA SET | MEM | MAs | BITS/RULE |
|---|---|---|---|
| ACL1 | 605 | 16 | 242 |
| ACL2 | 10487 | 24 | 4415 |
| ACL3 | 19591 | 43 | 8248 |
| ACL4 | 17661 | 44 | 7436 |
| ACL5 | 600 | 44 | 400 |
| FW1 | 308721 | 26 | 129735 |
| FW2 | 189751 | 24 | 79895 |
| FW3 | 341813 | 23 | 151916 |
| FW4 | 199096 | 24 | 93692 |
| FW5 | 347478 | 20 | 163519 |
| IPC1 | 38863 | 51 | 16363 |
| IPC2 | 64394 | 24 | 25757 |

SUCCINCT REPRESENTATION OF STATIC PACKET CLASSIFIERS

CROSS-REFERENCE TO RELATED APPLICATIONS

This application is the national stage entry of International Application No. PCT/US2007/075107, filed Aug. 2, 2007, which claims priority to U.S. Provisional Patent Application No. 60/821,220, filed Aug. 2, 2006, the disclosure of which is hereby incorporated by reference.

FIELD OF THE INVENTION

The present invention relates to communication network routers and routing techniques, and more particularly, to the representation of packet classifiers used for routing data packets.

BACKGROUND OF THE INVENTION

An Internet router classifies incoming packets based on their header fields using a classifier, which is typically implemented as a table of rules. Each classifier rule specifies a pair, (F, A), where F is a filter and A is an action. If an incoming packet matches a filter in the classifier, the associated action specifies what is to be done with this packet. Typical actions include packet forwarding and dropping.

A d-dimensional filter F is a d-tuple, (F[1], F[2], . . . , F[d]), where F[i] is a range that can specify destination addresses, source addresses, port numbers, protocol types, TCP flags, and other information. A packet is said to match filter F, if the packet's header field values fall in the ranges F[1], . . . , F[d]. Since it is possible for a packet to match more than one of the filters in a classifier, a tie breaker is typically used to determine a unique matching filter. In one-dimensional packet classification (i.e., d=1), F[1] is usually specified as a destination address prefix and lookup involves finding the longest prefix that matches the packet's destination address. Although 1-dimensional prefix filters are adequate for destination based packet forwarding, higher dimensional filters are generally required for firewall, quality of service, and virtual private network applications, for example.

One-Dimensional Packet Classification

The filters in a 1-dimensional classifier, as already noted, are assumed to be prefixes of destination addresses. Many of the data structures developed for the representation of a 1-dimensional classifier are based on a binary trie structure. A binary trie is a binary tree structure in which each node has a data field and two children fields. Branching is done based on the bits in the search key. A left child branch is followed at a node at level i (the root is at level 0) if the ith bit of the search key (the leftmost bit of the search key is bit 0) is 0; otherwise a right child branch is followed. Level i nodes store prefixes whose length is i in their data fields. The node in which a prefix is to be stored is determined by performing a search using that prefix as key. N can correspond to a node in a binary trie. Q(N) can be the bit string defined by the path from the root to N. Q(N) is the prefix that corresponds to N. Q(N) is stored in N.data in case Q(N) is one of the prefixes to be stored in the trie.

FIG. 1(a) shows a set of 5 prefixes. The * shown at the right end of each prefix is used neither for the branching described above nor in the length computation. So, the length of P2 is 1. FIG. 1(b) shows the binary trie corresponding to this set of prefixes. Shaded nodes correspond to prefixes in the rule table and each contains the next hop for the associated prefix. The binary trie of FIG. 1(b) differs from a 1-bit trie in that a 1-bit trie stores up to 2 prefixes in a node whereas each node of a binary trie stores at most 1 prefix. Because of this difference in prefix storage strategy, a binary trie may have up to 33 levels when storing IP.v4 prefixes, while the number of levels in a 1-bit trie is at most 32. A binary trie may have up to 129 levels when storing IP.v6 prefixes, while the number of levels in a 1-bit trie is at most 128.

For any destination address d, the longest matching prefix may be found by following a path beginning at the trie root and dictated by d. The last prefix encountered on this path is the longest prefix that matches d. While this search algorithm is relatively simple, it can result in as many cache misses as the number of levels in the trie. Even for IP.v4, this number, which is at most 33, is too large to classify/forward packets at line speed. Several strategies, such as LC trie, Lulea, tree bitmap, multibit tries, and shape shifting tries, have all been proposed to improve the lookup performance of binary tries. All of these strategies collapse several levels of each subtree of a binary trie into a single node, which is called a supernode, that can be searched with a number of memory accesses that is less than the number of levels collapsed into the supernode. For example, the correct child pointer (as well as its associated prefix) in a multibit trie can be accessed with a single memory access independent of the size of the multibit node. The resulting trie, which is composed of supernodes, is called a supernode trie.

Data structures have been developed for the compact representation of the supernodes. One such structure is the shape shifting trie (SST) structure proposed by Song, et al. (see "Shape Shifting Tries for Faster IP Route Lookup," Proceedings of 13$^{th}$ IEEE International Conference on Network Protocols, 2005), which in turn draws heavily from the tree bitmap (TBM) scheme of Eatherton, et al. (see "Tree bitmap: hardware/software IP lookups with incremental updates," Computer Communication Review, 34(2): 97-122, 2004) and a technique developed by Jacobson ("Succinct Static Data Structure," Carnegie Mellon University Ph.D Thesis, 1998) for the succinct representation of a binary tree. In TBM, the binary trie is partitioned into subtries that have at most S levels each. Each partition is then represented as a (TBM) supernode. S is the stride of a TBM supernode. While S=8 is suggested for real-world IPv4 classifiers, here S=2 is used to illustrate the TBM structure.

FIG. 2(a) shows a partitioning of the binary trie of FIG. 1(b) into 4 subtries W-Z that have 2 levels each. Although a full binary trie with S=2 levels has 3 nodes, X has only 2 nodes and Y and Z have only one node each. Each partition is represented by a supernode (FIG. 2(b)) that has the following components:

First, a ($2^S$−1)-bit internal bitmap (IBM) that indicates whether each of the up to $2^S$−1 nodes in the partition contains a prefix. The IBM is constructed by superimposing the partition nodes on a full binary trie that has S levels and traversing the nodes of this full binary trie in level order. For node W, the IBM is 110 indicating that the root and its left child have a prefix and the root's right child is either absent or has no prefix. The IBM for X is 010, which indicates that the left child of the root of X has a prefix and that the right child of the root is either absent or has no prefix (note that the root itself is always present and so a 0 in the leading position of an IBM indicates that the root has no prefix). The IBM's for Y and Z are both 100.

Second, a $2^S$-bit EBM (external bit map) that corresponds to the $2^S$ child pointers that the leaves of a full S-level binary trie has. The EBM for W is 1011, which indicates that only the right child of the leftmost leaf of the full binary trie is null. The EBMs for X, Y and Z are 0000 indicating that the nodes of X, Y and Z have no children that are not included in X, Y, and Z, respectively. Each child pointer from a node in one partition to a node in another partition becomes a pointer from a supernode to another supernode. To reduce the space required for these inter-supernode pointers, the children supernodes of a supernode are stored sequentially from left to right so that using the location of the first child and the size of a supernode, the location of any child supernode can be computed.

Third, a child pointer that points to the location where the first child supernode is stored.

And fourth, a pointer to a list NH of next-hop data for the prefixes in the partition. NH may have up to $2^S-1$ entries. This list is created by traversing the partition nodes in level order. The NH list for W is nh(P1) and nh(P2), where nh(P1) is the next hop for prefix P1. The NH list for X is nh(P3). Although the NH pointer is part of the supernode, the NH list is not. The NH list is conveniently represented as an array.

The NH list (array) of a supernode is stored separate from the supernode itself and is accessed only when the longest matching prefix has been determined, and when it is desired to determine the next hop associated with this prefix. If b bits are needed for a pointer, then a total of $2^{S+1}+2b-1$ bits (plus space for an NH list) are needed for each TBM supernode. Using the IBM, the longest matching prefix in a supernode can be determined; the EBM is used to determine whether it is necessary to move next to the first, second, and so fourth child of the current supernode. If a single memory access is sufficient to retrieve an entire supernode, it is possible to move from one supernode to its child with a single access. The total number of memory accesses to search a supernode trie becomes the number of levels in the supernode trie plus 1 (to access the next hop for the longest matching prefix).

The SST supernode structure is obtained by partitioning a binary trie into subtries that have at most K nodes each. K is the stride of an SST supernode. To correctly search an SST, each SST supernode requires a shape bit map (SBM) in addition to an IBM and EBM. The SBM is the succinct representation of a binary tree. It is obtained by replacing every null link in the binary tree being coded by the SBM with an external node, next by placing a 0 in every external node and a 1 in every other node, and finally, by traversing this extended binary tree in level order, listing the bits in the nodes as they are visited by the traversal.

If the example binary trie of FIG. 1(b) is to be partitioned into binary tries that have at most K=3 nodes each, FIG. 3(a) shows a possible partitioning into the 3 partitions X-Z. X includes nodes a, b and d of FIG. 1(b). Y includes nodes c, e and f. And Z includes node g. The SST representation has 3 (SST) supernodes. The SBMs for the supernodes X-Z, respectively, are 1101000, 1110000, and 100. Note that a binary tree with K internal nodes has exactly K+1 external nodes. So, when the binary trie is partitioned into binary tries that have at most K internal nodes, the SBM is at most 2K+1 bits long. Since the first bit in an SBM is 1 and the last 2 bits are 0, it is not necessary to store these bits explicitly. Hence, an SBM requires only 2K−2 bits of storage. FIG. 3(b) shows the node representation for each partition of FIG. 3(a). The illustrative SBMs exclude the first and last two bits.

The IBM of an SST supernode is obtained by traversing the partition in level order. When a node is visited, a 1 is output to the IBM if the node has a prefix and a 0 otherwise. The IBMs for nodes X-Z are, respectively, 110, 011, and 1. Note than the IBM of an SST supernode is at most K bits in length. To obtain the EBM of a supernode, starting with the extended binary tree for the partition, a 1 is placed in each external node that corresponds to a node in the original binary trie and a 0 in every other external node. Next, the external nodes are visited in level order and their bit is output to the EBM. The EBMs for the 3 supernodes are, respectively, 1010, 0000, and 00. Since the number of external nodes for each partition is at most K+1, the size of an EBM is at most K+1 bits.

As in the case of the TBM structure, child supernodes of an SST supernode are stored sequentially and a pointer to the first child supernode is maintained. The NH list for the supernode is stored in separate memory and a pointer to this list maintained within the supernode. Although the size of an SBM, IBM, and EBM varies with the partition size, an SST supernode is of a fixed size and allocates 2K bits to the SBM, K bits to the IBM and K+1 bits to the EBM. Unused bits are filled with 0 s. Hence, the size of an SST supernode is 4K+2b−1 bits.

An O(m) time algorithm, called post-order pruning, has been developed to construct a minimum-node SST, for any given K, from an m-node binary trie. A breadth-first pruning algorithm has also been developed to construct, for any given K, a minimum height SST. The complexity of this algorithm is $O(m^2)$.

For dense binary tries, TBMs are more space efficient than SSTs. However, for sparse binary tries, SSTs are more space efficient. A hybrid SST (HSST) has been proposed in which dense subtries of the overall binary trie are partitioned into TBM supernodes and sparse subtries into SST supernodes. FIG. 4 shows an HSST for the binary trie of FIG. 1(b). For this HSST, K=S=2. The HSST has two SST nodes X and Z, and one TBM node Y.

Two-Dimensional Packet Classification

The filters are assumed to be of the form (D, E), where D is a destination address prefix and E is a source address prefix. A 2-dimensional classifier may be represented as a 2-dimensional binary trie (2DBT), which is a one-dimensional binary trie (called the top-level trie) in which the data field of each node is a pointer to a (possibly empty) binary trie (called the lower-level trie). So, a 2DBT has 1 top-level trie and potentially many lower-level tries.

FIG. 5 illustrates an exemplary 5-rule two-dimensional classifier. For each rule, the filter is defined by the destination (Dest) and source (Source) prefixes. So, for example, F2=(0*, 1*) matches all packets whose destination address begins with 0 and whose source address begins with 1. When a packet is matched by two or more filters, the matching rule with least cost is used. The classifier of FIG. 5 may be represented as a 2DBT in which the top-level trie is constructed using the destination prefixes. In the context of our destination-source filters, this top-level trie is called the destination trie (or simply, dest trie). N is a node in the destination trie. If no dest prefix equals Q(N), then N.data points to an empty lower-level trie. If there is a dest prefix D that equals Q(N), then N.data points to a binary trie for all source prefixes, E, such that (D, E) is a filter. In the context of destination-source filters, the lower-level tries are called source trees. FIG. 6 gives the 2DBT for the filters of FIG. 5.

Two-dimensional one-bit tries, a close relative of 2DBTs, have been proposed for destination-source prefix filters. The proposed two-dimensional trie structure takes O(nW) memory, where n is the number of filters in the classifier and W is the length of the longest prefix. Using this structure, a packet may be classified with $O(W^2)$ memory accesses. The basic two-dimensional one-bit trie may be improved upon by using pre-computation and switch pointers. The improved version classifies a packet making only O(W) memory accesses. Extensions to higher-dimensional one-bit tries have also been proposed, which may be used with d-dimensional, d>2, filters. Two-dimensional one-bit tries with buckets can also be used for d-dimensional, d>2, classifiers. Basically, the destination and source fields of the filters are used to construct a two-dimensional one-bit trie. Filters that have the same destination and source fields are considered to be equivalent. Equivalent filters are stored in a bucket that may be searched serially. This scheme is expected to work well in practice because the bucket size tends to be small. Also, switch pointers may not be used in conjunction with the bucketing scheme. Fast polynomial-time algorithms have been developed to construct space-optimal constrained 2DMTs (two-dimensional multibit tries). The constructed 2DMTs may be searched with at most k memory accesses, where k is a design parameter. The space-optimal constrained 2DMTs may be used for d-dimensional filters, d>2, using the bucketing strategy. For the case d=2, switch pointers may be employed to get multibit tries that require less memory than required by space-optimal constrained 2DMTs and that permit packet classification with at most k memory accesses. A fast heuristic has also been developed to construct good multibit tries with switch pointers. Experiments indicate that, given the same memory budget, space-optimal constrained 2DMT structures perform packet classification using ¼ to ⅓ as many memory accesses as required by the two-dimensional one-bit tries.

SUMMARY OF THE INVENTION

The present invention provides a memory-efficient classifier representation that can be efficiently searched with a reduced number of memory accesses and a reduction in the total amount of computer memory required. One aspect of the invention is a procedure, based on a fast algorithm for constructing minimum-height SSTs, that reduces the complexity of the construction from $O(m^2)$ to $O(m)$, where m is the number of nodes in the input binary trie. Other aspects of the invention are dynamic programming procedures for the construction of space-optimal HSSTs and good 2DHSSTs and 2DHSSTPCs (constrained 2DHSSTs with prefix inheritance).

BRIEF DESCRIPTION OF THE DRAWINGS

There are shown in the drawings, embodiments which are presently preferred. It is expressly noted, however, that the invention is not limited to the precise arrangements and instrumentalities shown.

FIGS. 13(a) and (b) are tables of access and memory statistics, respectively, for IP4v data normalized by EBO data;

FIG. 14 is a graphical representation of the total memory required by IP4v tables;

FIG. 16 is a table of amounts of memory required by BARTs;

FIG. 17 is a table of the number of memory accesses required for a lookup in IP4v tables by each of the six algorithmic procedures implemented according to a particular embodiment of the invention;

FIGS. 19(a) and (b) are tables of access and memory statistics, respectively, for IP6v data normalized by EBO data;

FIG. 20 is a table the total memory required by IP6v tables;

FIG. 22 is a table of the total memory and number accesses required by IP4v tables after optimization according to a particular embodiment of the invention;

FIG. 23 is a table of the total memory and number of memory accesses required by 2DHSSTs and 2DHSSTPCs of the invention;

FIG. 28 is a table of total memory (KBytes), bits/rule, and number of memory accesses required by HyperCuts on 5-dimensional data sets.

DETAILED DESCRIPTION

Figure 7:
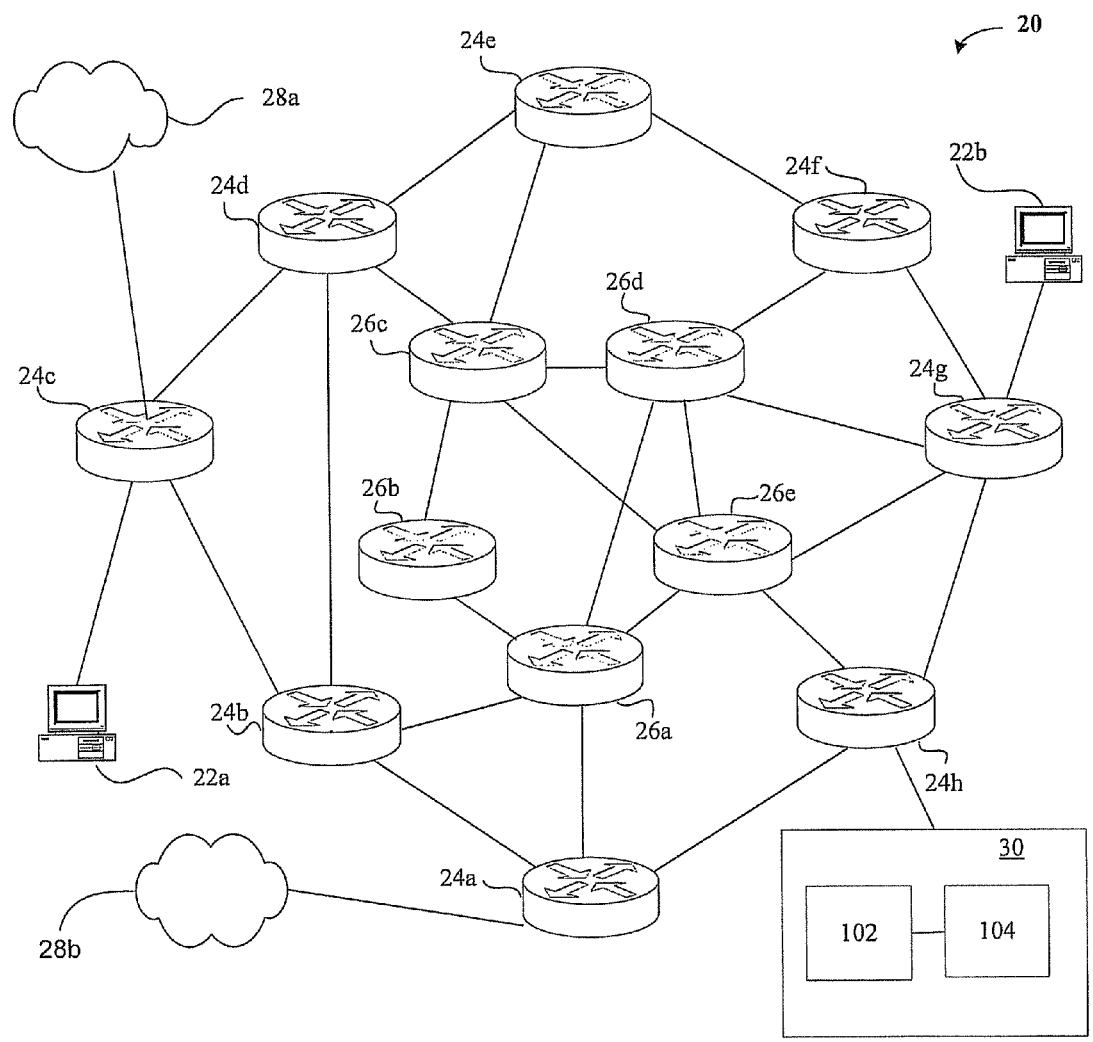
FIG. 7 is schematic view of a data communications network in which a system, according to a particular embodiment of the invention, is deployed.

FIG. 7 schematically illustrates a data communication network 20, which is an exemplary environment in which a system 100, according to one embodiment, can be deployed. The data communication network 20 illustratively comprises a plurality of hosts 22a, 22b, only two of which are shown, a plurality of nodes 24a-h, 26a-e to which the hosts are connected, and two additional exemplary networks 28a, 28b connected to the plurality of nodes. Those skilled in the art will readily appreciate that the data communication network 20 can be the Internet, a local area network (LAN), for example, or any other network formed by two or more hosts whose application-layer programs communicate with one another by transmission of packetized data routed through the various nodes. The nodes 24a-h, 26a-e can be routers, hubs, bridges, or any other general purpose computer or application-specific processing device able to store and forward data packets based on stored routing information. The plurality of nodes 24a-h, 26a-e classify incoming data packets into flows based on information contained in the headers of the packets and on information each node stores in its router table. Each entry in the table is a filter-action pair.

The system 100, more particularly, is a system for classifying the packets of data transmitted over the data communications network 20. Though shown as a distinct element for ease of presentation, the system 100 can be implemented in one or more nodes 24a-h, 26a-e of the data communications network 20. As shown, the system 100 is communicatively linked to the various nodes 24a-h, 26a-e of the data communications network 20.

The system 100 comprises a combination of hardware and software modules for classifying packets of data transmitted over the data communications network 20. Illustratively, the system includes a memory 102. With in the memory 102, at least one packet classifier rule defined by a plurality of filters is stored as computer-readable code. Each filter uniquely corresponds to a one of a plurality of actions to be taken in transmitting the data packets over the data communications network 20.

Additionally, the system 100 includes a processor 104 comprising logic circuitry (not explicitly shown) that responds to and processes computer-readable instructions or code. Specifically, the processor 104 is configured to access the packet classifier rule in the memory 102 and to classify a data packet based upon the packet classifier rule. As described more particularly below, the data packet is classified by the processor 104 generating at least one supernode trie subject to a predetermined constraint for reducing accesses to the memory. The supernode trie is explicitly defined in context of the algorithmic processes described below.

According to one embodiment, the classifier rule comprises a 1-dimensional node, space-optimal supernode and wherein the predefined constraint minimizes memory accesses performed by the processor in classifying the data packet. According to another embodiment, the classifier rule comprises a multi-dimensional node, space-optimal supernode, wherein the predefined constraint minimizes memory accesses performed by the processor in classifying the data packet. Thus, the processor 104, according to this embodiment, can be configured to generate a supernode that corresponds to a predefined constraint that minimizes storage of the at least one classifier rule within the memory.

The various embodiments of the invention include algorithm-based procedures, which can be implemented in computer-readable code, for succinctly representing 1-dimensional tries and 2-dimensional tries. The algorithms are described herein, along with rigorous proofs demonstrating the logical basis of each.

Minimum-Height SSTs

The invention encompasses algorithms for the succinct representation packet classifiers. More particularly, the embodiments of the invention include algorithms for the succinct representations of 1-dimensional tries and 2-dimensional tries.

The breadth-first pruning algorithm constructs, for any given K and binary trie T, a minimum height SST. The complexity of this algorithm is $O(m^2)$, where m is the number of nodes in T. The present invention provides an $O(m)$ algorithm for this task. This algorithm, referred to herein as minHtSST, performs a postorder traversal of T. When a node x of T is visited during this traversal, one or both of the currently remaining subtries of x and, at times, even the entire remaining subtrie rooted at x may be pruned off to form a node of the SST being constructed.

When minHtSST visits a node x of T, some (or all) of the descendents of x in T have been pruned by earlier node visits. The pruned descendents of x have been mapped into supernodes that form one or more SSTs. These SSTs are referred to as the SSTs that hang from x. Some of these SSTs that hang from x were created during visits of nodes in the left subtree of x. These SSTs are called the left hanging SSTs; the remaining SSTs are the right hanging SSTs of x. The following notation is used: x.leftChild (x.rightChild) is the left (right) child of x in T; x.st is the set of nodes in the subtrie of T rooted at x; x.rn (remaining nodes) is the subset of x.st that have not been pruned off at the time x is visited; x.size is the number of nodes in x.rn; x.SSTs is the set of SSTs that hang from x at the time x is visited; x.leftSST s (x.rightSST s) is the subset of x.SST s that are left (right) hanging SSTs. x.lht=−1 (left height) if x.leftSST s is empty. Otherwise, x.lht is the maximum height of an SST in x.leftSST s (the height of an SST is 1 less than the number of levels in the tree). x.rht is the corresponding quantity for the x.rightSST s and x.ht=max{x.lht, x.rht}.

The function prune(y) prunes T at the node y by removing all nodes in y.rn. The nodes in y.rn are used to create a supernode whose subtries are y.SST s. When y is NULL, prune(y) is a NULL operation. The following is the visit function employed by the postorder traversal algorithm minHtSST:

```
Case 1: [x.lht == x.rht]
    if (x.size > K) {prune(x.leftChild); prune(x.rightChild);}
    else if (x.size == K) prune(x);
    return;
Case 2: [x.lht < x.rht]
    prune(x.leftChild);
    update x.size;
    if (x.size == K) prune(x);
    return;
Case 3: [x.lht > x.rht]
    Symmetric to Case 2.
``` x is the node of T being visited. This visit function has 3 mutually exclusive cases. Exactly one of these is executed during a visit.

As demonstrated herein, if T is traversed in postorder using the visit function, then x.leftChild.size<K and x.rightchild.size<K when x is visited. Less evident is the fact that when x is visited, every node y that is in the left (right) subtree of x and in x.rn has y.ht=x.lht (x.rht).

Lemma 1: When x is visited, every node y that is in the left (right) subtree of x and in x.rn has y.ht=x.lht (x.rht).

Proof: u is the nearest left descendent (i.e., descendent in the left subtrie) of x that is in x.rn and has u.ht≠x.lht. If there is no such u, then y.ht=x.lht for every left descendent y of x that is in x.rn. So, assume there is such a u. Clearly, u.ht<x.lht. so u cannot be the left child of x as otherwise x.leftSST s=u.SST s and so x.lht=u.ht. Therefore, u has a parent v that is in x.rn (v also is a left descendent of x) and u.ht<v.ht=x.lht. Without loss of generality, assume that u is the left child of v. Thus, v.lht=u.ht<v.ht=v.rht. During the postorder traversal of T, node v is visited before node x. When v was visited, v's left subtree (including node u) should have been pruned from T (Case 2 of the visit function) and so u cannot be in x.rn, which is a contradiction.

The proof for nodes that are in the right subtree of x and in x.rn is similar.

Theorem 1: For every binary trie T and integer K>0, the postorder traversal algorithm minHtSST constructs an SST that has minimum height.

Proof: The theorem can be established by showing that if there is a minimum height SST for T that includes all the supernodes constructed up to (but not including) the time a node x is visited, then there is a minimum height SST for T that includes all the supernodes constructed up to and including the visit of x. Since the antecedent of this statement is true when the first node of T is visited, the theorem follows by induction.

Consider the visit of any node x of T. U is an SST that includes all supernodes constructed by the algorithm up to this time. If, during the visit of x, no new supernodes are constructed, then there is nothing to proven. Therefore, assume that one or more supernodes are constructed. P denotes the (super)node of U that includes x.

Suppose the new supernodes are constructed in Case 1 of the visit function. So, x.lht=x.rht and x.size≧K. If x.size≧K, P cannot include all nodes of x.rn. Thus, some of the nodes of x.rn are contained in descendents of P. From Lemma 1 above, it can be obtained y.ht=x.lht x.rht=x.ht for every y∈x.rn other than y=x. Hence, the height of the subSST of U rooted at P is at least x.ht+2. Now, delete the nodes of x.rn (other than x) from the supernodes of U, delete from U any supernodes that become empty, and add to U the two supernodes constructed by prune(x.leftChild) and prune(x.rightChild). An SST U' for T is obtained whose height is no more than that of U and which contains all the supernodes constructed up to and including the visit of x. If x.size=K, P may include all nodes of x.rn. In this case, U has all the supernodes constructed by the algorithm up to and including the visit of x. If P does not include all nodes of x.rn, some nodes of x.rn must be in descendent nodes of P and so, as before, the height of the subSST rooted at P is at least x.ht+2. Now, delete the nodes of x.rn from the supernodes of U, delete from U any supernodes that become empty, and add to U the supernode constructed by prune(x). An SST U' for T is obtained whose height is no more than that of U and which contains all the supernodes constructed up to and including the visit of x.

If the new supernode is constructed in Case 2, the height of the subSST of T rooted at P is at least x.rht+1. Delete the left descendents of x that are in x.rn from the supernodes of U, delete from U any supernodes that become empty, and add to U the supernode constructed by prune(x.leftChild). An SST U' for T is obtained whose height is no more than that of U. Now, if x.size=K, do the transformation given above in Case 1 (x.size=K) and obtain an SST whose height is no more than that of U and which contains all the supernodes constructed up to and including the visit of x.

The proof for Case 3 is similar to that for Case 2.

Since the visit function can be implemented to run in O(1) time, the complexity of the postorder traversal function minHtSST is O(m) where m is the number of nodes in the binary trie T. Note that the number of nodes in the binary trie for n prefixes whose length is at most W is O(nW). So, in terms of n and W, the complexity of minHtSST is O(nW).

Space-Optimal HSSTs

Let minSpHSST (T, H) be a minimum space HSST for the binary trie T under the restrictions that the stride of the TBM nodes is S and that of the SST nodes is K and the height of the HSST is at most H. Assume that S and K are such that the size of a TBM supernode is the same as that of an SST supernode. Although it may not be possible to choose S and K so that the number of bits needed by a TBM supernode is exactly equal to that needed by an SST supernode, in practice, node size is chosen to match the bandwidth of the memory. This means that a few bits are wasted in every supernode, if necessary, to ensure a supernode size equal to the memory bandwidth. So, in practice, with the wasted memory factored in, the size of a TBM supernode equals that of an SST supernode. Hence, minimizing the space required by an HSST is equivalent to minimizing the number of supernodes in the HSST. Therefore, the number of supernodes in an HSST is used as a measure of its space requirement.

Let ST (N) denote the subtree of T that is rooted at node N. So, T=ST (root(T)). Let opt(N, h) be the number of supernodes in minSpHSST (ST(N), h). opt(root(T), H) is the number of supernodes in minSpHSST (T, H). The present invention provides a dynamic programming recurrence for opt(N, h). This recurrence may be solved to determine opt(root(T), H). A simple extension to the recurrence can be used to actually compute minSpHSST (T, H).

Let opt(N, h, k) be the number of supernodes in a space-optimal HSST for ST (N) under the restrictions: (a) the root of the HSST is an SST supernode for exactly k, 0<k≦K, nodes of the binary trie ST (N) (k is the utilization of the SST node) and (b) the height of the HSST is at most h. Let Dt(N) be the descendents (in T) of N that are at level t of ST (N).

There are two possibilities for the root of minHSST (ST (N), h), h≧0: the root is a TBM supernode or the root is an SST supernode. In the former case, $$opt(N, h) = 1 + \sum_{R \in Ds(N)} opt(R, h-1) \qquad (1)$$

and in the latter case, $$opt(N, h) = \min_{0<k \leq K} \{opt(N, h, k)\} \qquad (2)$$

Combining these two cases together, it can be obtained $$opt(N, h) = \min\{1 + \sum_{R \in Ds(N)} opt(R, h-1), \min_{0<k \leq K} \{opt(N, h, k)\}\} \qquad (3)$$

To simplify the recurrence for opt(N, h, k), the function f(N, h, k) is used, which gives the number of supernodes in the space-optimal HSST for the binary trie composed of ST (N) and the parent of N (assuming that N is not the root of T) under the restrictions: (a) the root of the HSST is an SST supernode whose utilization is k+1 and (b) the height of the HSST is at most h. Note that when k=0, the root of this HSST contains only the parent of N. So, f(N, h, 0)=1+opt(N, h−1). When k>0, the root represents a partition that includes the parent of N plus k nodes of ST (N). So, f(N, h, k)=opt(N, h, k). To obtain the recurrence for opt(N, h, k), h>0 and k>0, consider three cases, namely N has 0, 1, and 2 children, are considered.

When N has no child, $$opt(N,h,k)=1 \quad (4)$$

When N has only one child a, $$opt(N,h,k)=f(a,h,k-1) \quad (5)$$

When N has two children a and b, $$opt(N, h, k) = \min_{0<j\leq K} \{f(a, h, j) + f(b, h, k - j - 1) - 1\} \quad (6)$$

Finally, for h<0, $$opt(N,h,k)=opt(N,h)=\infty \quad (7)$$

and for k≦0, $$opt(N,h,k)=\infty \quad (8)$$

as it is not possible to represent ST (N) by an HSST whose height is less than 0 or by an HSST whose root is an SST node with utilization ≦0.

Using Equation 3, each opt(*, *) value can be computed in O(K) time, since $|D_S(N)| \leq 2^S \approx 2K$. Also, each opt(*, *, *) value can be computed in O(K) time using Equations 4-8. There are O(mH) opt(*, *) and O(mHK) opt(*, *, *) values to compute. Hence, the time complexity is O(mHK+mHK²)=O(mHK²)=O(nWHK²), where n is the number of filters and W is the length of the longest prefix.

Space-Optimal 2DHSSTs

Let T be a 2DBT. Assume that the source tries of T have been modified so that the last prefix encountered on each search path is the least-cost prefix for that search path. This modification is accomplished by examining each source-trie node N that contains a prefix and replacing the contained prefix with the least-cost prefix on the path from the root to N. A 2DHSST may be constructed from T by partitioning the top-level binary trie (i.e., the dest trie) of T and each lower-lever binary trie into a mix of TBM and SST supernodes. Supernodes that cover the top-level binary trie use their NH (next hop) lists to store the root supernodes for the lower-level HSSTs that represent lower-level tries of T.

Figure 1:
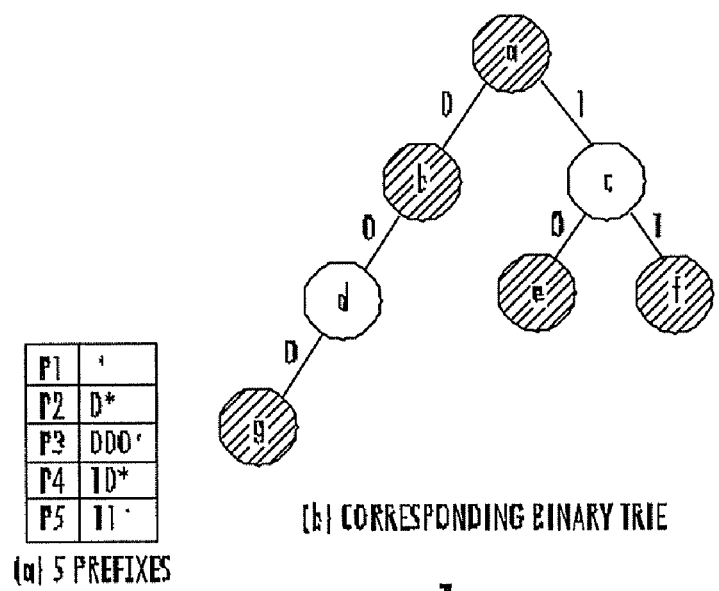
FIG. 1(a) is a schematic representation of an exemplary set of 5 prefixes and the corresponding binary trie.
FIG. 1(b) is a schematic representation of a binary trie corresponding to the prefixes of FIG. 1(a)
Figure 2:
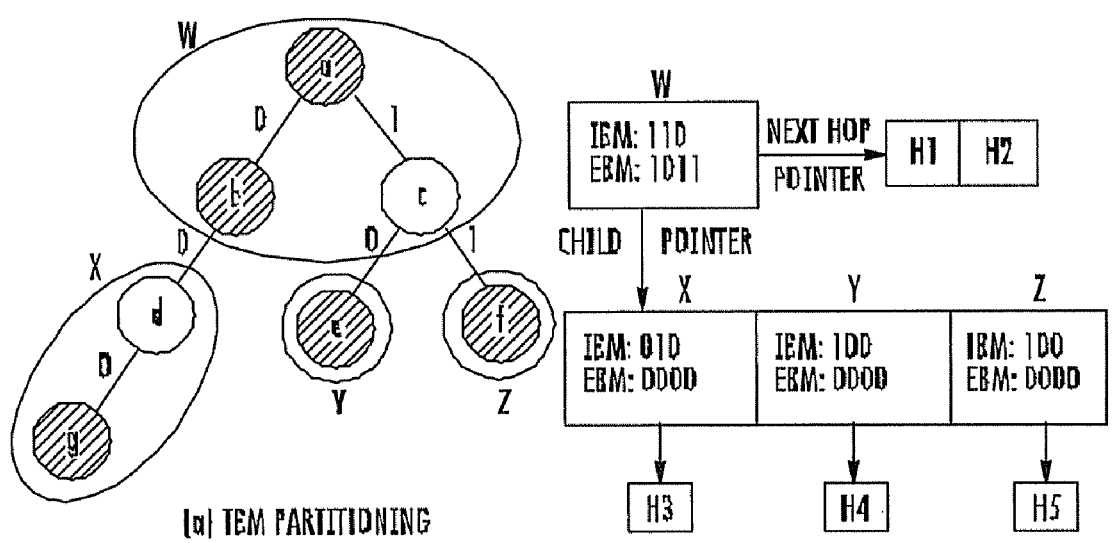
FIG. 2 is a schematic representation of a partitioning of the binary trie of FIG. 1(b) using a TBM scheme.
Figure 3:
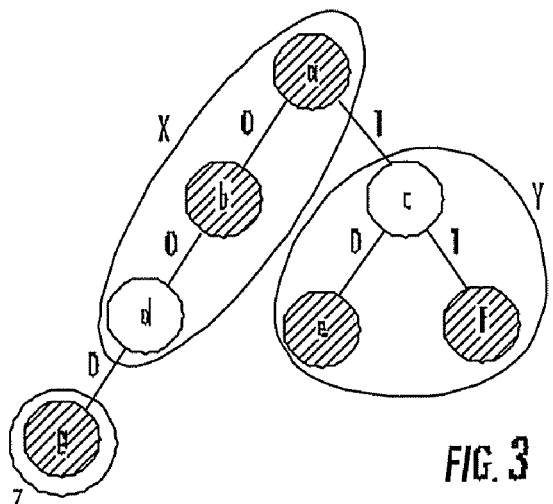
FIG. 3 is a schematic representation of a partitioning of the binary trie of FIG. 1(b) using an SST scheme.
Figure 3:
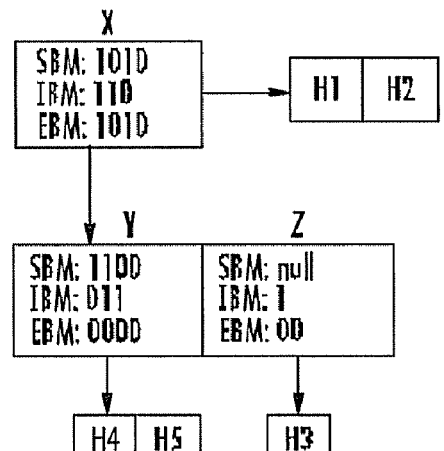
Figure 4:
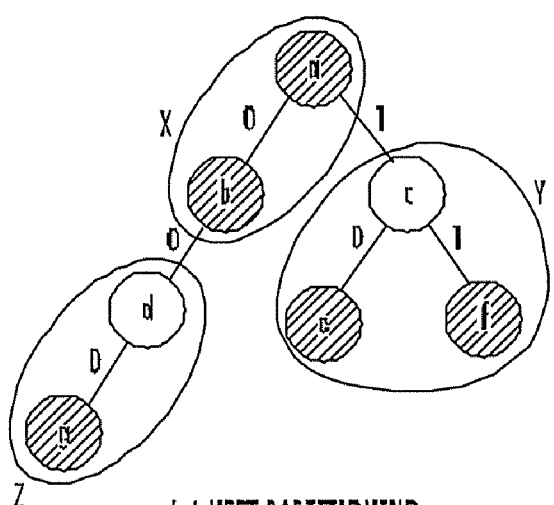
FIG. 4 is a schematic representation of a partitioning of the binary trie of FIG. 1(b) using a HSST scheme.
Figure 4:
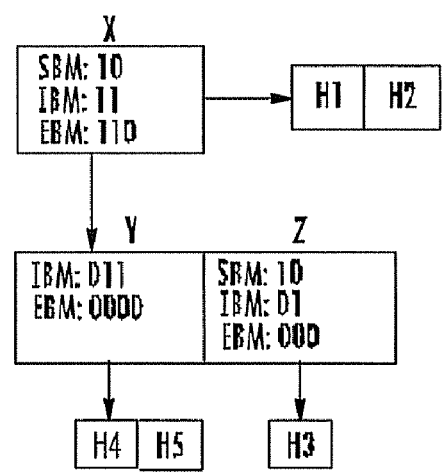
Figures 5, 6:
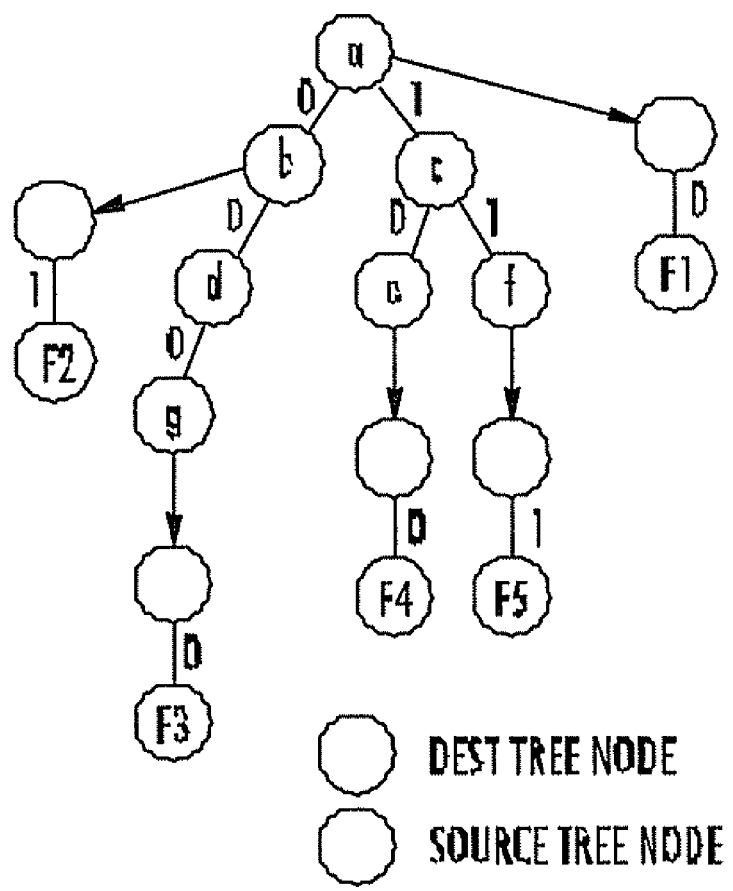
FIG. 5 is a schematic representation of exemplary five dest-source filters.
FIG. 6 is a schematic representation of a 2DBT for FIG. 5.
Figure 8:
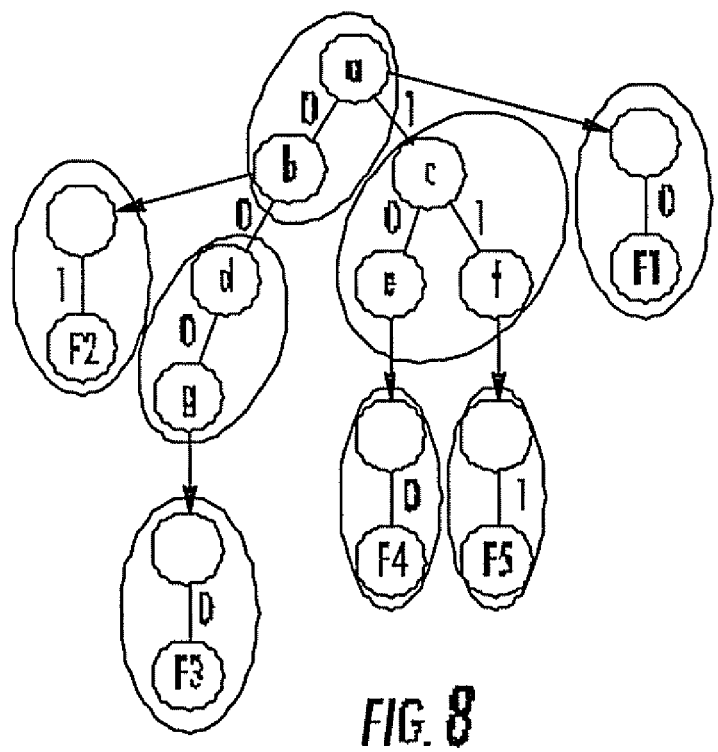
FIG. 8 schematically illustrates the construction of a two-dimensional supernode trie (2DHSST) for FIG. 6, according to a particular embodiment of the invention.

FIG. 8 shows a possible 2DHSST for the 2DBT of FIG. 6. The supernode strides used are K=S=2. A 2DHSST may be searched for the least-cost filter that matches any given pair of destination and source addresses (da, sa) by following the search path for da in the destination HSST of the 2DHSST. All source tries encountered on this path are searched for sa. The least-cost filter on these source-trie search paths that matches sa is returned. Suppose finding the least-cost filter that matches (000, 111), the search path for 000 first starts from the root (ab) of the 2DHSST of FIG. 8 and then goes to the left child (dg). In the 2DHSST root, the search goes through nodes a and b of the dest binary trie and in the supernode dg through nodes d and g of T. Three of the encountered nodes (a, b, and g) have a hanging source trie. The corresponding source HSSTs are searched for 111 and F2 is returned as the least-cost matching filter.

To determine the number of memory accesses required by a search of a 2DHSST, assume sufficient memory bandwidth that an entire supernode (this includes the IBM, EBM, child and NH pointers) may be accessed with a single memory reference. To access a component of the NH array, an additional memory access is required. For each supernode on the search path for da, one memory access is made to get the supernode's fields (e.g., IBM, EBM, child and NH pointers).

In addition, for each supernode on this path, it is necessary to examine some number of hanging source HSSTs. For each source HSST examined, first a component of the dest-trie supernode's NH array is accessed to get the root of the hanging source HSST. Then this hanging source HSST is searched by accessing the remaining nodes on the search path (as determined by the source address) for this HSST. Finally, the NH component corresponding to the last node on this search path is accessed. So, in the case of the above example, 2 memory accesses are made to fetch the 2 supernodes on the dest HSST path. In addition, 3 source HSSTs are searched. Each requires an access to its root supernode plus an NH component in each source HSST. The total number of memory accesses is 2+2*3=8.

Let MNMA(X) be the maximum number of memory accesses (MNMA) required to search a source HSST X. For a source HSST, the MNMA includes the access to NH component of the last node on the search path. So, MNMA(X) is one more than the number of levels in X. Let U be a 2DHSST for T with strides S and K. Let P be any root to leaf path in the top level HSST of U. Let the sum of the MNMAs for the lower-level HSSTs on the path P be H(P). Let nodes(P) be the number of supernodes on the path P. Define 2DHSST (h) to be the subset of the possible 2DHSSTs for T for which $$\max_{P}\{H(P) + \text{nodes}(P)\} \leq h \quad (9)$$

Note that every U, U∈2DHSST (h), can be searched with at most h memory accesses per lookup. Note also that some 2DHSSTs that have a path P for which H(P)+nodes(P)=h can be searched with fewer memory accesses than h as there may be no (da, sa) that causes a search to take the longest path through every source HSST on paths P for which H(P)+nodes(P)=h.

Consider the construction of a space-optimal 2DHSST V such that V∈2DHSST (H), such a V being referred to as a space-optimal 2DHSST (h). Let N be a node in T's top-level trie, and let 2DBT (N) be the 2-dimensional binary trie rooted at N. Let opt1(N, h) be the size (i.e., number of supernodes) of the space-optimal 2DHSST (h) for 2DBT (N). opt1(root(T), H) gives the size of a space-optimal 2DHSST (H) for T. Let g(N, q, h) be the size (excluding the root) of a space-optimal 2DHSST (h) for 2DBT (N) under the constraint that the root of the 2DHSST is a TBM supernode whose stride is q. So, g(N, S, h)+1 gives the size of a space-optimal 2DHSST (h) for 2DBT (N) under the constraint that the root of the 2DHSST is a TBM supernode whose stride is S. It can be seen that, for q>0, $$g(N, q, h) = \quad (10)$$

$$\min_{m(N)\leq i\leq h} \{g(LC(N), q-1, h-i) + g(RC(N), q-1, h-i) + s(N, i)\}$$

where m(N) is the minimum possible value of MNMA for the source trie (if any) that hangs from the node N (in case there is no source trie hanging from N, m(N)=0), g(N, 0, h)=opt1(N, h−1), g(null, t, h)=0, and LC(N) and RC(N) respectively, are the left and right children (in T) of N. s(N, i) is the size of the space-optimal HSST for the source trie that hangs off from N under the constraint that the HSST has an MNMA of at most i. s(N, i) is 0 if N has no hanging source trie.

Let opt1(N, h, k) be the size of a space-optimal 2DHSST (h) for 2DBT (N) under the constraint that the root of the 2DHSST is an SST supernode whose utilization is k. It is easy to see that $$opt1(N, h) = \min\{g(N, S, h) + 1, \min_{0<k\leq K}\{opt1(N, h, k)\}\} \quad (11)$$

Suppose that k>0 and h>0. If N has no child, $$opt1(N,h,k)=1+s(N,h-1) \quad (12)$$

When N has only one child a, $$opt1(N, h, k) = \min_{m(N)\leq i\leq h}\{f(a, h-i, k-1) + s(N, i)\} \quad (13)$$

where f(N, h, k) is the size of a space-optimal 2DHSST (h) for 2DBT (N) plus the parent (in T) of N (but excluding the lower-level source trie (if any) that hangs from N) under the constraint that the root of the 2DHSST is an SST supernode whose utilization is k+1. For example, when k=0, the root of the constrained 2DHSST has a utilization 1 and contains only the parent of N; the remaining supernodes of the 2DHSST represent 2DBT (N). Thus f(N, h, k)=opt1(N, h, k) when k>0 and 1+opt1(N, h−1, 0) when k=0.

When N has two children a and b, $$opt1(N, h, k) = \min_{m(N)\leq i\leq h}\{\min_{0\leq j\leq K}\{f(a, h-i, j) + \quad (14)$$
$$f(b, h-i, k-j-1)-1\} + s(N, i)\}$$

For h≤0

$$opt1(N,h,*)=\infty \quad (15)$$

When there are n filters and the length of the longest prefix is W, the number of nodes in the dest trie of T is O(nW) and the number of source tries in T is O(n). The time to compute all s(N, h) values using the algorithm described in Section "Space-Optimal 2DHSSTs" to compute opt is $O(n^2WHK^2)$ time. Using Equation 10 and previously computed g values, O(H) time is needed to compute each g(*, *, *) value. Using Equation 11, each opt1(*, *) value may be computed in O(K) time. Using Equations 12-15, each opt1(*, *, *) value can be computed in O(KH) time. Since there are O(nWH) opt1(*, *), O(nWHK) opt1(*, *, *), and O(nWSH) g(*, *, *) values to compute, the time to determine opt1(root(T),H) is $O(n^2WHK^2+nWHK+nW H^2 K^2+nWS H^2)=O(n^2WHK^2)$ (as, in typical applications, n>H).

2DHSSTs With Prefix Inheritance (2DHSSTP)

Let T be the 2DBT of FIG. 6. Consider the dest-trie supernode ab of FIG. 8. This supernode represents the subtrie of T that is comprised of the binary nodes a and b. A search in this subtrie has three exit points: left child of b, right child of b, and right child of a. For the first two exit points, the source tries that hang off of a and b are searched whereas for the third exit point, only the source trie that hangs off of a is searched. In other words, the first two exit points use the source tries that hang off of a and b while the third exit point uses only the source trie that hangs off of a. If the source trie that hangs off of b is augmented with the prefixes in the source trie that hangs off of a, then when the first two exit points are used, only the augmented source trie that hangs off of b need be searched.

Figure 9:
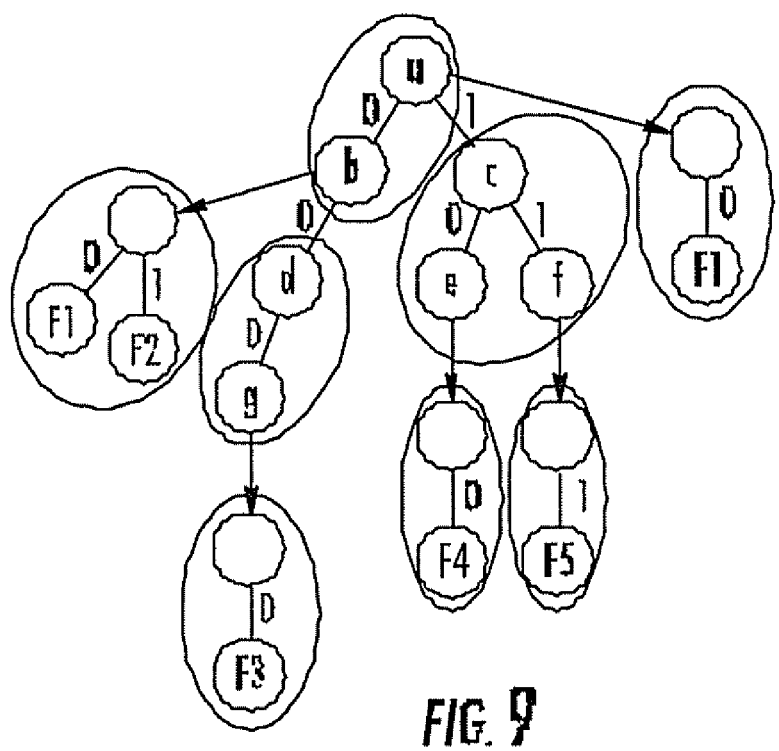
FIG. 9 schematically illustrates the construction of a 2DHSST with prefix inheritance (2DHSSTP) for FIG. 8, according to a particular embodiment of the invention.

In prefix inheritance, each non-empty source trie in a partition is augmented with the prefixes in all source tries that hang off of ancestors in the partition. When this augmentation results in duplicate prefixes, the least-cost prefix in each set of duplicates is retained. The resulting augmented source tries are called exit tries. In a 2DHSST with prefix inheritance (2DHSSTP), prefix inheritance is done in each supernode. FIG. 9 gives the 2DHSSTP for the 2DHSST of FIG. 8.

Notice that to search a 2DHSSTP, at most one exit trie for each dest-trie supernode encountered needs to be searched: the last exit trie encountered in the search of the partition represented by that dest-trie supernode. So, when searching for (da, sa)=(000, 111), the exit tries that hang off of b and g are searched for 111. The number of memory accesses is 2 (for the two supernodes ab and dg)+2 (to access the supernode in each of the two source tries searched)+2 (to access the NH arrays for the source trie supernodes)=6. The same search using the 2DHSST of FIG. 8 will search three source tries (those hanging off of a, b, and g) for a total cost of 8 memory accesses.

A node N in a dest-trie partition is a dominating node if there is an exit trie on every path from N to an exit point of the partition. Notice that if N has two children, both of which are dominating nodes, then the exit trie (if any) in N is never searched. Hence, there is no need to store this exit trie.

A good algorithm to construct a space-optimal constrained 2DHSSTP for any 2DBT T has been developed by the inventors of the instant application. Note that the 2DHSSTP for T is comprised of supernodes for the dest-trie of T plus supernodes for the exit tries.

Let 2DHSSTPC(h) be a 2DHSSTP that is constrained so that (a) it can be searched with at most h memory accesses and (b) the HSST for each exit trie is a minimum height HSST for that exit trie. The experimental studies suggest that the space required by an HSST is somewhat insensitive to the height constraint placed on the HSST. So, the space required by a space-optimal 2DHSSTPC(h) is expected to be close to that required by a space-optimal 2DHSSTP(h).

Let N be a node in the dest-trie of the 2DBT T and let opt2(N, h) be the size of a space-optimal 2DHSSTPC(h) for the subtree, ST (N), of T rooted at N. The supernode strides are K and S. Notice that opt2(root(T), H) gives the size of a space-optimal 2DHSSTPC(H) for T. The development of a dynamic programming recurrence for opt2 follows the pattern used for the earlier dynamic programming recurrences. Suppose that the root of the space-optimal 2DHSSTPC(N) is a TBM supernode. Then, $$opt2(N, h) = 1 + ss(N) + \sum_{R\in Ds(N)} opt2(R, h-1-h(R)) \quad (16)$$

where ss(N) is the sum of the sizes of the minimum height HSSTs for the exit tries of the root TBM supernode and h(R) is the MNMA for the last exit trie (if any) of the root that is on the path to R; if there is no exit trie on this path, then h(R)=0.

The only other possibility for the root of the 2DHSSTPC (h) is that it is an SST node whose occupancy is k for some k in the range [1,K]. Let 2DHSSTPC(N, h, k, p) be a 2DHSST-PC(h) for ST (N) under the constraints (a) the root of the 2DHSSTPC is an SST node whose utilization is k and (b) for the root, prefix inheritance is not limited to the partition of T represented by the root of the 2DHSSTPC; rather prefix inheritance extends up to the p nearest ancestors of N in T. Let opt2(N, h, k, p) be the size of a space-optimal 2DHSSTPC(N, h, k, p). It can be seen that:

$$opt2(N, h) = \min_{0 < k \leq K} \{opt2(N, h, k, 0)\} \qquad (17)$$

To facilitate the computation of opt2(N, h, k, p), three new functions: s(N, p), h(N, p) and x(N, h, k, p) are introduced. If N has a non-empty source trie, then s(N, p) is the size of a space-optimal minimum-height HSST for the union of the source tries that hang off of N and its p nearest ancestors in T and h(N, p) is the MNMA for this HSST. Otherwise, s(N, p)=h(N, p)=0. The s(N, p) values are computed prior to this postorder traversal using the algorithm of Section "Space-Optimal 2DHSSTs." The h(N, p) values are computed easily during the computation of the s(N, p) values.

x(N, h, k, p) is the size of a space-optimal 2DHSSTPC(N, h, k, p) under the added constraint that the root of the 2DHSSTPC(N, b, k, p) is a dominating node. Recurrences for opt2(N, h, k, p) and x(N, h, k, p) can be obtained by considering three cases for N. When N has no child (i.e., N is a leaf), $$opt2(N, h, k, p) = \begin{cases} \infty & \text{if } k < 1 \text{ or } h < h(N, p) \\ 1 + s(N, p) & \text{otherwise} \end{cases} \qquad (18)$$

$$x(N, h, k, p) = \begin{cases} \infty & \text{if } k < 1 \text{ or } h < h(N, p) \text{ or} \\ & N \text{ has an empty source trie} \\ opt2(N, h, k, p) & \text{otherwise} \end{cases} \qquad (19)$$

When N has a single child a, $$opt2(N, h, k, p) = \qquad (20)$$
$$\begin{cases} 1 + opt2(a, h - 1 - h(N, p)) + s(N, p) & \text{if } k = 1 \\ opt2(a, h, k - 1, p + 1) + s(N, p) & \text{otherwise} \end{cases}$$

$$x(N, h, k, p) = \begin{cases} \infty & \text{if } k < 1 \text{ or } h < h(N, p) \text{ or} \\ & N \text{ has an empty source trie} \\ opt2(N, h, k, p) & \text{otherwise} \end{cases} \qquad (21)$$

When N has two children a and b, $$opt2(N, h, k, p) = \begin{cases} 1 + opt2(a, h - 1 - h(N, p)) + opt2(b, h - 1 - h(N, p)) + s(N, p) & \text{if } k = 1 \\ \min\{opt2(a, h - 1 - h(N, p)) + opt2(b, h, k - 1, p + 1) + s(N, p), & \text{otherwise} \\ opt2(a, h, k - 1, p + 1) + opt2(b, h - 1 - h(N, p)) + s(N, p), \\ \min_{0 < j < k-1}\{opt2(a, h, j, p + 1) + opt2(b, h, k - j - 1, p + 1)\} - 1 + s(N, p), \\ \min x(N, h, k, p)\} \end{cases} \qquad (22)$$

where $$\min x(N, h, k, p) = \min_{0 < j < k-1}\{x(a, h, j, p + 1) + x(b, h, k - j - 1, p + 1)\} - 1 \qquad (23)$$

$$x(N, h, k, p) = \begin{cases} \min x(N, h, k, p) & \text{if } N \text{ has an empty source trie} \\ opt2(N, h, k, p) & \text{otherwise} \end{cases} \qquad (24)$$

Combining Equations 16 and 17, it can be obtained $$opt2(N, h) = \min\left\{1 + ss(N) + \sum_{Q \in Ds(N)} opt2(Q, h - 1 - h(Q)),\right.$$
$$\left.\min_{0 < k \leq K}\{opt2(N, h, k, 0)\}\right\} \qquad (25)$$

When there are n filters and the length of the longest prefix is W, the number of nodes in the dest trie of T and hence the number of exit tries is O(nW). Using the algorithm of Section "Space-Optimal HSSTs", all s(*, *) and h(*, *) values may be computed in $O(n^2W^2HK^2)$ time. Following this computation, each ss(N) value may be computed in $O(2^S)=O(K)$ time by traversing the first S levels of the subtree of T rooted at N. Thus all ss(*) values may be determined in O(nWK) additional time. As can be seen from Equation 25, O(K) time is need to compute each opt2(*, *) value (assuming that the ss and opt2 terms in the right-hand-side of the equation are known). It takes O(K) time to compute each opt2(*, *, *, *) and x(*, *, *, *) value. As there are O(nWH) opt2(*, *) values and $O(nW^2HK)$ opt2(*, *, *, *) and x(*, *, *, *) values, the total time complexity is $O(n^2W^2HK^2+nWK+nWHK+nW^2HK^2)=O(n^2W^2HK^2)$.

Implementation Considerations

HSSTs

If each supernode can be examined with a single memory access, then an HSST whose height is H (i.e., the number of levels is H+1) may be searched for the next hop of the longest matching prefix by making at most H+2 memory accesses. To get this performance, the supernode parameters K and S must be chosen such that each type of supernode can be retrieved with a single access. The size of a TBM node is $2^{S+1}+2b-1$ bits and that of an SST node is 4K+2b−1 bits. An additional bit is needed to distinguish the two node types. So, any implementation of an HSST must allocate $2^{S+1}+2b$ bits for a TBM node and 4K+2b bits for an SST node. Such an implementation is referred to as the base implementation of an HSST. Let B be the number of bits that may be retrieved with a single memory access and suppose b=20 bits is used for a pointer. When B=72, the supernode parameters become K=8 and S=4. When B=64, the supernode parameters become K=6 and S=3. Because of the need to align supernodes with word boundaries, each TBM node wastes 8 bits when B=64.

An alternative implementation, called the prefix-bit implementation, has been proposed for supernodes. This alternative implementation employs the prefix-bit optimization technique. An additional bit (called prefixBit) is added to each supernode. This bit is a 1 for a supernode N if the search path through the parent supernode (if any) of N that leads to N goes through a binary trie node that contains a prefix. With the prefixBit added to each supernode, an HSST may be searched as follows:

Step 1: Move down the HSST keeping track of the parent, Z, of the most recently seen supernode whose prefixBit is 1. Do not examine the IBM of any node encountered in this step.

Step 2: Examine the IBM of the last supernode on the search path. If no matching prefix is found in this supernode, examine the IBM of supernode Z.

When prefix-bit optimization is employed, it is possible to have a larger K and S as the IBM (K or $2^S-1$ bits) and NH (b bits) fields of a supernode are not accessed (except in Step 2). So, it is sufficient that the space needed by the remaining supernode fields be at most B bits. The IBM and NH fields may spill over into the next memory word. In other words, K and S are selected to be the largest integers for which $3K+b+1 \leq B$ and $2^S+b+2 \leq B$. When B=72 and b=20, K=17 and S=5 are used; and when B=64 and b=20, K=14 and S=5 are used. When prefix-bit optimization scheme is employed, the number of memory accesses for a search is H+4 as two additional accesses (relative to the base implementation) are needed to fetch the up to two IBMs and NH fields that may be needed in Step 2.

The additional access to the IBM of Z may be avoided by using controlled leaf pushing. Recall that each supernode of an HSST represents a subtree of the binary trie T for the classifier. In controlled leaf pushing, the root N of the binary subtree represented by each supernode is examined. If N contains no next hop, the next hop of the longest prefix that matches Q(N) is added to N. Note that when controlled leaf pushing is used, no prefixBit is needed and it is not necessary to keep track of the parent node Z during a lookup. This implementation of HSSTs with controlled leaf pushing is referred to as the enhanced prefix-bit implementation. The number of memory accesses required for a lookup in an enhanced prefix-bit implementation is H+3.

Base Implementation Optimization

When the base implementation is used and b=20, the value of K can be increased by 5 if the NH pointer (for a saving of b bits) can be eliminated. The elimination of the NH pointer may also lead to an increase in S. To eliminate the NH pointer, the next-hop array, NA, of a supernode N is stored next to its child array, CA. The start of the next-hop array for N can be computed from the child pointer of N and knowledge of the number of children supernodes that N has. The latter may be determined from the EBM of N. Since the size of a next-hop array may not be a multiple of B, this strategy may result in each next-hop array wasting up to B−1 bits as each child array must be aligned at a word boundary. The total number of words of memory used by this enhanced base implementation can be reduced if some of the (CA, NA) pairs are paired and the second (CA,NA) tuple in each pair is flipped. For example, suppose that B=72, each next-hop entry uses 18 bits, NA1 requires 162 bits, and NA2 requires 180 bits. Each entry in a child array is a supernode that uses B bits. Since each (CA, NA) must start at a word boundary, placing (CA1, NA1) and (CA2, NA2) into memory uses n1+n2+6 B-bit words, where n1 and n2 are, respectively, the number of supernodes in CA1 and CA2. If (CA2, NA2) is flipped to get (NA2, CA2) then the next-hop array NA2 can use 36 of the 54 bits of a B-bit word not used by NA1 and reduce the total word count by 1. This sharing of a B-bit word by NA1 and NA2 leaves 18 unused bits in the shared B-bit word and the child array CA2 remains aligned to a word boundary. The child pointer for (NA2, CA2) now points to the start of the array NA2 and to compute the start of the array CA2 from this child pointer, the number of next-hop entries in NH2 must be known. This number can be determined from the IBM. To employ this flipping strategy to potentially reduce the total memory required by the enhanced base implementation, each supernode must be augmented with a bit that identifies the orientation (CA, NA) or (NA, CA) used for its child and next-hop arrays.

To minimize the memory used by the enhanced base implementation, the following restricted bin packing problem (RBIN) must be solved: pack n integers $b_1, \ldots, b_n$, in the range $[1, B]$, into the smallest number of size B buckets such that no bucket is assigned more than two of the integers. The RBIN problem may be solved in O(n log n) time by using the first-fit decreasing heuristic modified so as to pack at most two items in each bin. The optimality of this strategy is easily established by induction on n. An alternative strategy is to sort the $b_i$s into decreasing order and then to repeatedly pair the smallest unpaired $b_i$ with the largest unpaired $b_j$ (under the constraint that the sum of the paired bis no more than B). The pairing process terminates when no new pair can be created. The number of remaining singletons and pairs is the minimum number of bins needed for the packing.

End-Node Optimized HSSTs

Figures 10, 11:
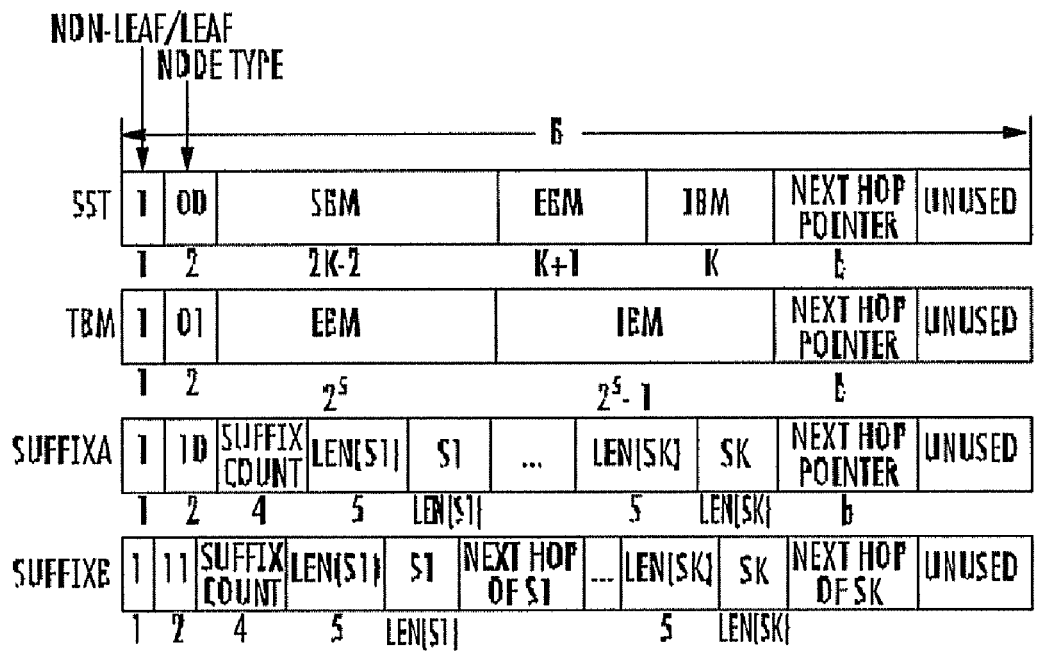
FIG. 10 schematically illustrates the construction of four leaf supernode formats, according to a particular embodiment of the invention.
FIG. 11 is a graphical representation of the number of memory accesses required for a lookup in IP4v tables using each of the algorithmic procedure of the invention.

A further reduction in the space requirements of an HSST may be achieved by employing end-node optimization. Four formats for a leaf supernode are permitted. FIG. 10 shows these four formats for the base implementation. Each supernode (leaf or non-leaf) uses a bit to distinguish between leaf and non-leaf supernodes. Each leaf supernode uses two additional bits to distinguish among the four leaf formats while each non-leaf supernode uses an additional bit to distinguish between SST and TBM supernodes. The leaf supernodes are obtained by identifying the largest subtries of the binary trie T that fit into one of the four leaf-supernode formats. Notice that a leaf supernode has no child pointer. Consequently, in the SST format a larger K may be used than used for non-leaf supernodes and in the TBM format, a larger S may be possible. The third format (SuffixA) is used when the prefixes in a subtrie are packed into a single supernode. For this packing, let N be the root of the subtrie being packed. Then, Q(N) (the prefix defined by the path from the root of T to N) is the same for all prefixes in the subtrie rooted at N. Hence the leaf supernode need store only the suffixes obtained by deleting Q(N) from each prefix in ST (N). The leaf supernode stores the number of these suffixes, followed by pairs of the form (suffix length, suffix). In FIG. 10, len(S1) is the length of the first suffix and S1 is the first suffix in the supernode. Leaf supernodes in the third format are searched by serially examining the suffixes stored in the node and comparing these with the destination address (after this is stripped of the prefix Q(N); this stripping may be done as moving from root(T) to N). The fourth format (SuffixB), which is similar to the third format, avoids the memory access required by the third format to extract the next hop. When controlled leaf pushing is applied to SuffixB supernodes, the worst-case number of memory accesses required for a lookup may decrease. Note that in the absence of controlled leaf pushing, if no matching prefix is found in a SuffixB leaf supernode, an additional access would be needed to extract the next hop associated with the longest matching prefix along the search path.

For all ST (N)s may be represented by a leaf supernode of the first three types, set opt(N, h)=1 for h≧0 and for all ST (N)s that may be represented by a SuffixB supernode, set opt(N, h)=1 for h≧−1. The dynamic programming recurrence of the Section "Space-Optimal HSSTs" is then used to determine opt(root(T),H).

Although end-node optimization has only been described for the base implementation, this technique may be applied to the enhanced prefix-bit implementation as well to reduce total memory requirement.

2DHSSTs and 2DHSSTPCs

The enhanced base implementation of an HSST is used for both the dest and source tries of a 2DHSST and a 2DHSSTPC. End node optimization is done on each source trie of a 2DHSST and a 2DHSSTPC. For the dest trie, however, the following are done:

1. Cut off the leaves of the dest binary trie prior to applying the equations of the Sections "Space-Optimal 2DHSSTs" and "2DHSSTs With Prefix Inheritance (2DHSSTP)" to construct space-optimal 2DHSSTs and 2DHSSTPCs. Following the construction, identify the parent dest-trie supernode for each leaf that was cut off.

2. In the case of 2DHSSTPCs, each source trie that hangs off of a leaf of the dest binary trie, inherits the prefixes stored along the path, in the parent dest-trie supernode, to this leaf.

3. Each cut-off leaf is replaced by the HSST for its source trie (this source trie includes the inherited prefixes of (2) in case of a 2DHSSTPC). The root of this HSST is placed as the appropriate child of the parent dest-trie supernode. (This requires the use of an additional bit to distinguish between dest-trie supernodes and source HSST roots.)

By handling the leaves of the binary dest-trie as above, the need to search the source tries that are on the path, in the dest-trie parent, to a leaf child is eliminated.

Finally, for 2DHSSTPCs, the time and space required to construct space-optimal structures may be reduced by using an alternative definition of the p used in the Section "2DHSSTs With Prefix Inheritance (2DHSSTP)." In this new definition, prefix inheritance extends up to the p nearest ancestors of N in T that have a non-empty source trie. Since, on typical data sets, a dest-trie node has a small (say 3 or 4) number of ancestors that have non-empty source tries while the number of ancestors may be as large as 32 in IPv4 and 128 in IPv6, the new definition of p allows working with much smaller ps. This reduces the memory required by the arrays for x(*, *, *, *) and opt2(*, *, *, *) and also reduces the computation time. Note that the equations of the Section "2DHSSTs With Prefix Inheritance (2DHSSTP)" have to be modified to account for this change in definition. Note also that while the space required for minx(*, *, *, *) also is reduced, the recurrences of the Section "2DHSSTs With Prefix Inheritance (2DHSSTP)" may be solved without actually using such an array.

Experimental Results

C++ codes for the algorithms for space-optimal 1- and 2-dimensional supernode tries were compiled using the GCC 3.3.5 compiler with optimization level O3 and run on a 2.80 GHz Pentium 4 PC. The algorithms were benchmarked against recently published algorithms to construct space-efficient data structures for 1- and 2-dimensional packet classification. The benchmarked algorithms seek to construct lookup structures that (a) minimize the worst-case number of memory accesses needed for a lookup and (b) minimize the total memory needed to store the constructed data structure. As a result, the experiments measured only these two quantities. Further, all test algorithms were run so as to generate a lookup structure that minimizes the worst-case number of memory accesses needed for a lookup; the size (i.e., memory required) of the constructed lookup structure was minimized subject to this former constraint. For benchmarking purposes, it is assumed that the classifier data structure will reside on a QDRII SRAM, which supports both B=72 bits (dual burst) and B=144 bits (quad burst). For the experiments, b=22 bits is used for a pointer (whether a child pointer or a pointer to a next-hop array) and 12 bits for each next hop. In the case of two-dimensional tables, the priority and action associated with a prefix need to be stored. 18 bits are allocated for this purpose.

One-Dimensional Routing Tables

Four variants of the space-optimal HSST were implemented: enhanced prefix-bit (EP), enhanced prefix-bit with end-node optimization (EPO), enhanced base (EB), and enhanced base with end-node optimization (EBO). In addition, the BFP algorithm of Song, et al. and the variant 3 algorithm (which is referred to as V3MT) of Sun, et al. are considered to construct multi-way trees. Extensive experiments reported in Sun, et al. establish the superiority of V3MT, in terms of space and lookup efficiency, over other known schemes for space and time efficient representation of IP lookup tables. Song, et al. establishes the superiority of BFP over TBM of Eatherton, et al. However, Song, et al. did not compare BFP to V3MT.

IPv4 Router Tables

For test data, both IPv4 and IPv6 router tables are used. First, the IPv4 experiments will be reported, which were conducted using the six IPv4 router tables Aads, MaeWest, RRC01, RRC04, AS4637 and AS1221. The number of prefixes in these router tables is 17486, 29608, 103555, 109600, 173501 and 215487, respectively.

Figure 12:
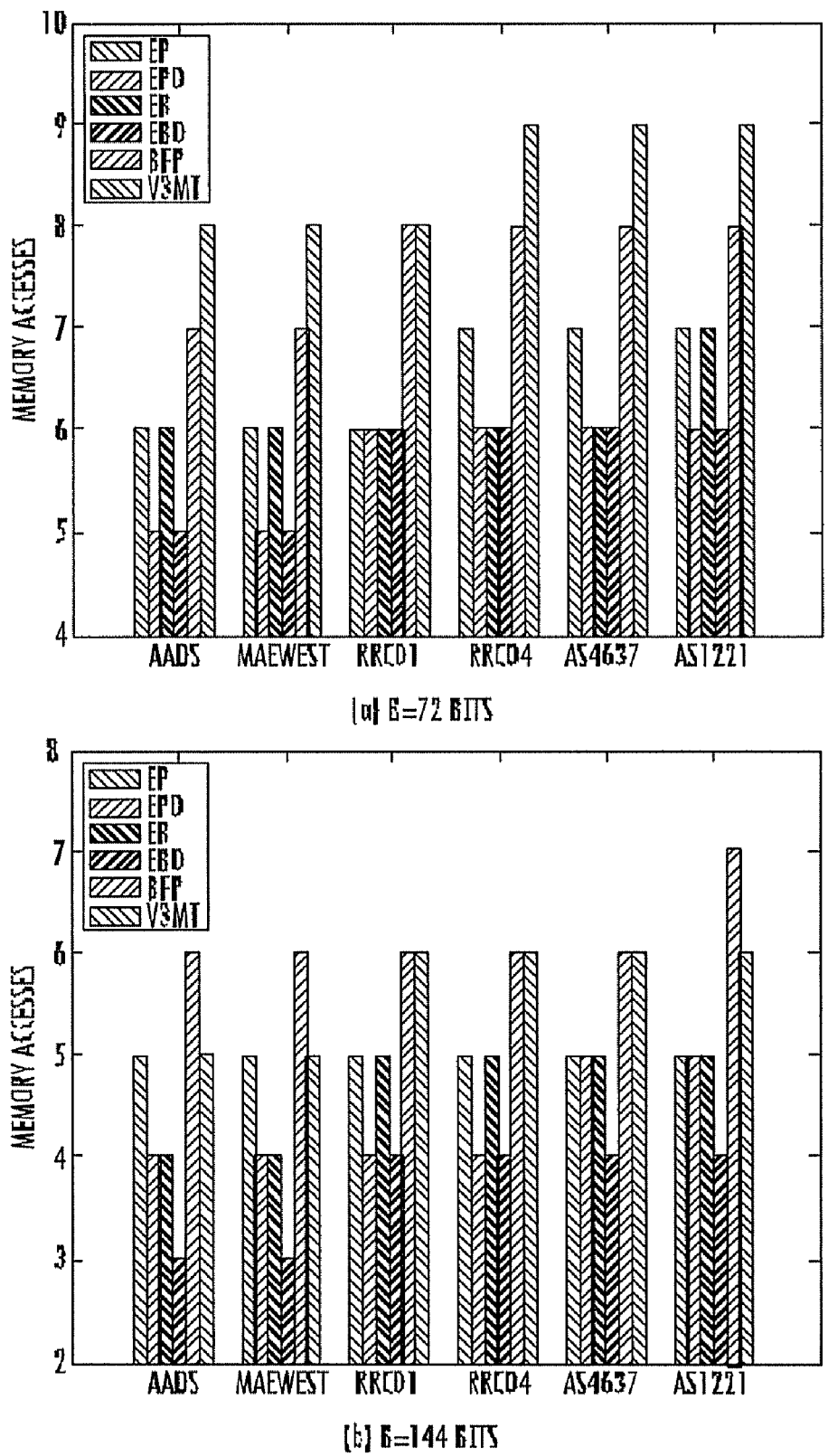
FIG. 12 is a graphical representation of the number of memory accesses shown in FIG. 11 in column chart.

FIG. 11 shows the number of memory accesses required for a lookup in the data structure constructed by each of the algorithms (assuming the root is held in a register) in the present invention. Unlike the access counts reported in Song, et al. and Sun, et al., the numbers reported by the present invention include the additional access (if any) needed to obtain the next hop for the longest matching prefix. FIG. 12 plots this data. As can be seen, EBO results in the smallest access counts for all of the test sets; EPO ties with EBO on all of the six test sets when B=72 (other experiments with 9-bit next hop and 18-bit pointer fields indicate that EBO often requires one memory access less than EPO when B=72) and on 2 of the test cases when B=144.

FIG. 13(a) normalizes the access count data by the counts for EBO and presents the min, max, and standard deviation of the normalized count for the 6 data sets. The number of memory accesses for a lookup in the structure constructed by BFP ranges from 1.33 to 2.00 times that required by the EBO structure; on average the BFP structure requires 1.53 times the number of accesses required by the EBO structure and the standard deviation is 0.25.

The number of memory accesses required by the structures constructed by each of the 6 test algorithms reduces when B goes from B=72 to B=144. The reduction for EPO is between 17% and 33% (the mean and standard deviation are 23% and 8%). The reduction for EBO is from 33% to 40% (the mean and standard deviation are 36% and 3%). Notice that when B=72, BFP outperformed V3MT by 1 memory access on 5 of the 6 data sets and tied on the sixth. However, when B=144, V3MT outperformed BFP by 1 memory access on 3 of the 6 data sets and tied on the remaining 3.

Figure 15:
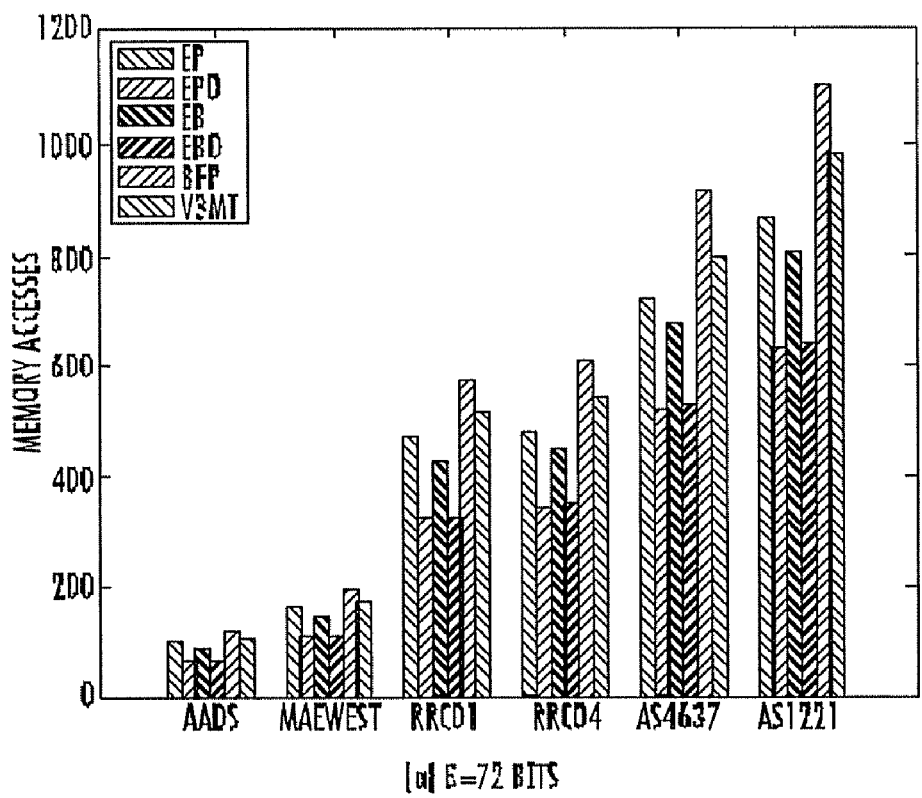
FIGS. 15(a) and (b) are graphical representations of the required total memory as shown in FIGS. 14(a) and (b) in column charts, according to a particular embodiment of the invention.
Figure 15:
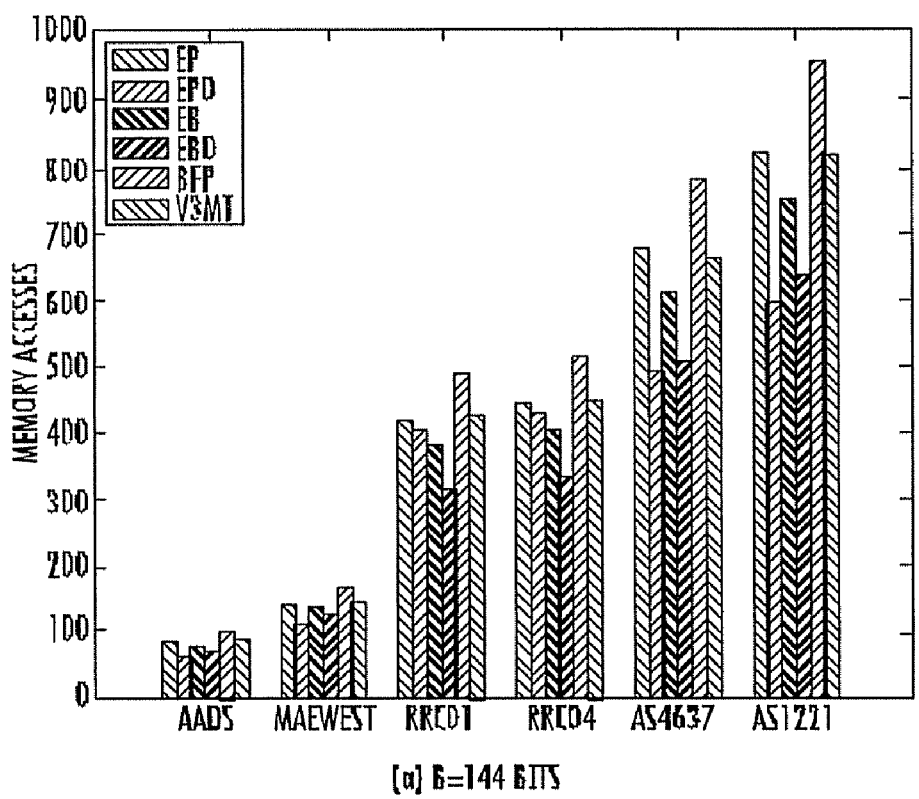

FIG. 14 shows the total memory required by the lookup structure constructed by each of the 6 algorithms. FIG. 15 plots this data and FIG. 13(b) presents statistics normalized by the data for EBO. As can be seen, EPO and EBO result in the least total memory requirement. Although EPO is slightly superior to EBO on the memory measure on 9 of our 12 test cases, the total memory required by EBO for all 12 test cases is 2% less than that required by EPO. The search structures constructed by the remaining algorithms required, on average, between 23% and 61% more memory than did the structures constructed by EBO. When B=72, the average number of bits of storage needed per prefix is 48 for BFP, 42 for V3MT and 27 for EBO. The corresponding numbers for the case when B=144 are 41, 35, and 27.

When B is increased from 72 to 144, the memory required by EPO and EBO decreased for 4 of the 6 data sets and increased for the remaining 2. The B=144 memory normalized by the B=72 memory is between 0.95 and 1.26, the average and standard deviation being 1.05 and 0.15, respectively. For EBO, the corresponding normalized numbers were 0.96, 1.13, 1.0, and 0.07.

On the IPv4 data sets, EBO and EPO are the clear winners. EBO is slightly superior to EPO on the memory access measure and the two are very competitive on the memory required measure. Since the former is more important, EBO is recommended over EPO. The EBO lookup structures require 25% to 50% fewer accesses than do the BFP structures; they also reduce memory requirement by 24% to 44%. The reduction in number of memory accesses and memory requirement relative to V3MT are 25% to 40% and 12% to 38%.

Comparison with Other Succinct Representations

One proposed a succinct router table structure is called Lulea. This is a 3-level multibit trie. A lookup in Lulea requires 12 memory accesses. So, as far as lookup time goes, Lulea is inferior to all 6 of the structures considered above. Since the code for Lulea is nit available, only an approximate memory comparison is conducted. Degermark, et al. report memory requirements for 6 databases, the largest of which has 38,141 prefixes and uses 34 bits of memory per prefix. Since the memory required per prefix decreases as database size increases, it is compared with MaeWest, which has 29,608 prefixes (this comparison biases in favor of Lulea). On MaeWest, with B=72, EPO, EBO, BFP and VM3T, respectively, require 32, 31, 55, and 49 bits per prefix. The corresponding numbers with B=144 are 30, 35, 46, and 40. Note that this is a very approximate comparison for the following reasons (1) the databases are different and (2) the number of bits allocated to pointers and next hops is different in Lulea and the remaining structures. For example, the Lulea scheme requires the size of a pointer to be the same as that of a next hop and so allocates 14 bits to each. In the above experiments, 22 bits for a pointer and 12 for a next hop are used. Reducing the next hop size to 12 bits in Lulea doesn't reduce the total memory required unless the pointer size is also reduced to 12 bits. Assuming these inequities balance out, the data suggest that EPO and EBO are superior to Lulea on both the lookup complexity and memory complexity!

Lunteren I has proposed a succinct representation of a multibit trie using perfect hash functions—balanced routing table search(BARTs). The first row of FIG. 16 gives the memory requirement of BARTs 12-4-4-4-8, one of his two most memory efficient schemes (the other scheme is BARTs 8-4-4-4-4-8, which requires slightly less memory but two more accesses for a search). The number of memory accesses needed for a lookup is 9 in BARTs 12-4-4-4-8. By comparison, the lookup complexity for EBO with B=72 is 5 or 6 accesses/lookup, and the total memory required is between 38% and 43% the memory of BARTs 12-4-4-4-8. Note that the implementation assumptions used by Lunteren I and the present invention are slightly different. Lunteren I allocates 18 bits for each pointer and next hop whereas 22 bits for a pointer and 12 for a next hop are allocated in the present invention. The scheme of Lunteren I requires pointers and next hops to be of the same size. In reality, the number of different next hops is small and 12 bits are adequate. On the other hand, for large databases, 18 bits may not be adequate for a pointer. Despite these minor differences, the experiments show that EBO is superior to the scheme of Lunteren I on both lookup complexity and total memory required.

Lunteren II describes a related perfect-hash-function strategy (BARTS) for very wide memories, $B \geq 288$. The second row of FIG. 16 shows the memory requirement of his most memory efficient scheme, BARTS 12-6-6-8, for very wide memories. The reported data is for the case B=288. The number of memory accesses needed for a lookup is 4. EBO with B=144 achieves a lookup complexity of 3 or 4 accesses/lookup while requiring from 44% to 60% of the memory required by BARTS 12-6-6-8.

IPv6 Router Tables

For the IPv6 experiments, the 833-prefix AS1221-Telstra router table is used that as well as 6 synthetic IPv6 tables. Prefixes longer than 64 were removed from the AS1221-Telstra table as current IPv6 address allocation schemes use at most 64 bits. For the synthetic tables, the strategy proposed in Wang, et al. ("Non-random Generator for IP6v Tables," 12th Annual IEEE Symposium on High Performance Interconnects, 2004) is used to generate IPv6 tables from IPv4 tables. In this strategy, a 16-bit string is prepended to each IPv4 prefix, which is comprised of 001 followed by 13 random bits. If this prepending doesn't at least double the prefix length, a sufficient number of random bits is prepended so that the length of the prefix is doubled. Following this prepending and possible appending, the last bit from one-fourth of the prefixes is dropped so as to maintain the 3:1 ratio of even length prefixes to odd length observed in real router tables. Each synthetic table is given the same name as the IPv4 table from which it was synthesized. The AS1221-Telstra IPv6 table is named AS1221* to distinguish it from the IPv6 table synthesized from the IPv4 AS1221 table.

Figure 18:
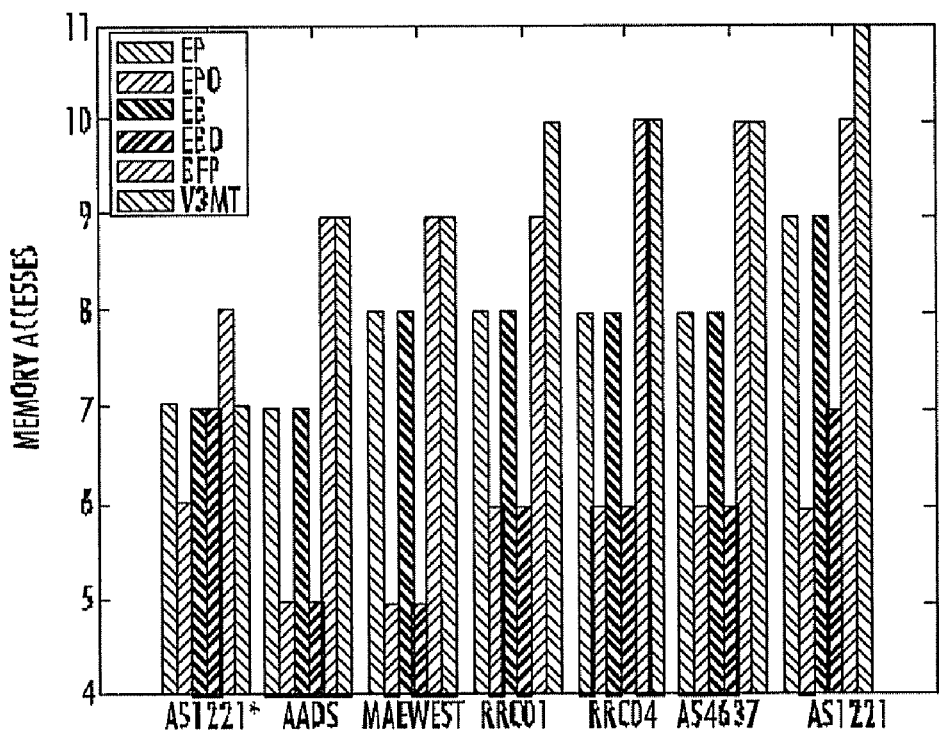
FIG. 18 is a graphical representation of the number of memory accesses shown in FIG. 17.
Figure 18:
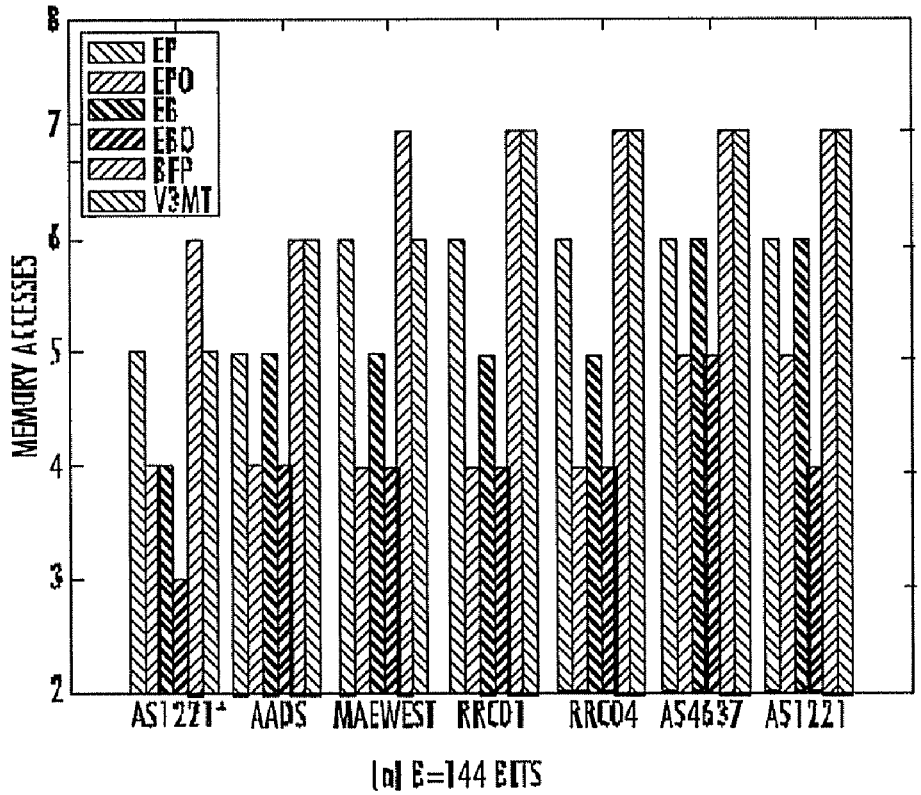
Figure 21:
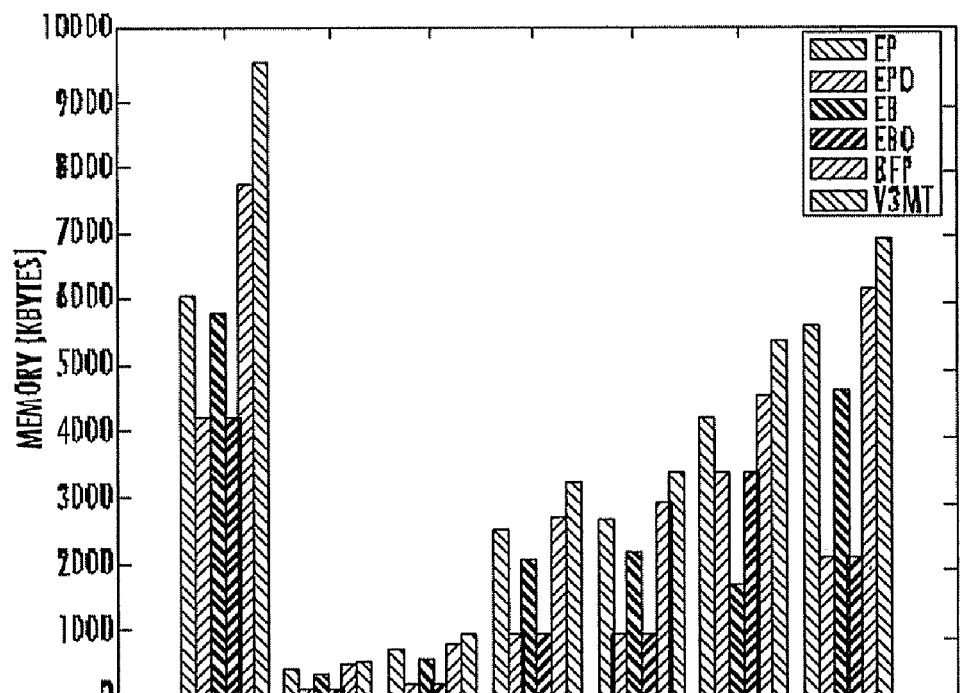
FIG. 21 is a graphical representation of the required total memory as shown in FIG. 20.
Figure 21:
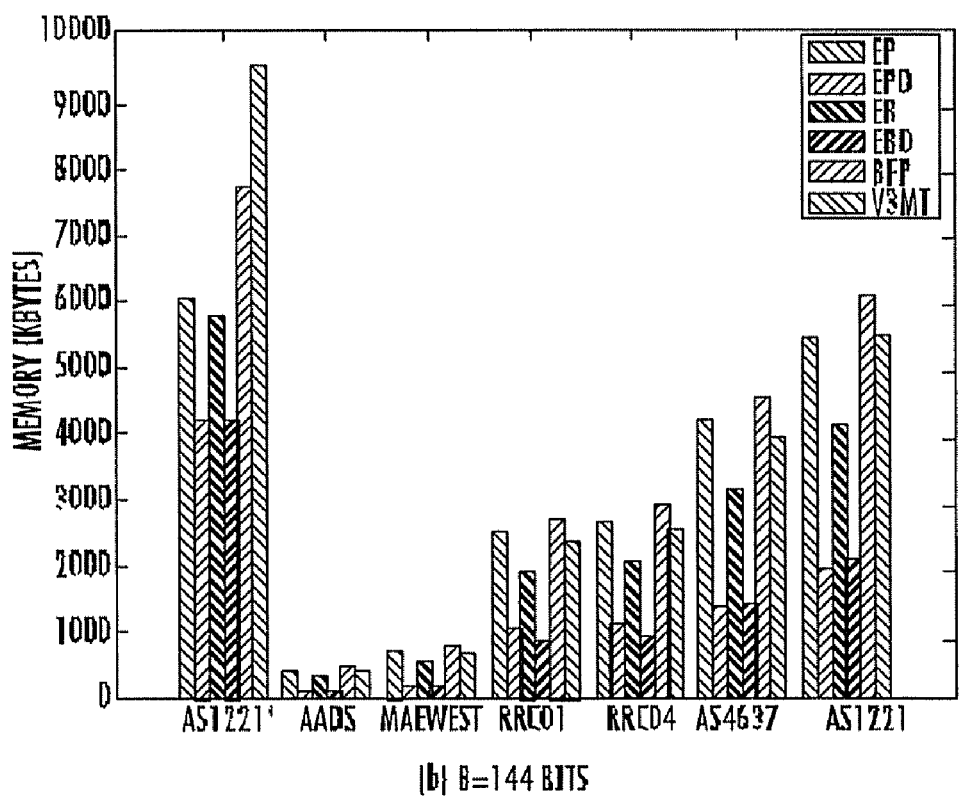

FIGS. 17 and 20 give the number of memory accesses and memory required by the search structures for the 7 IPv6 data sets. FIGS. 18 and 21 plot these data and FIG. 19 gives statistics normalized by the data for EBO. EPO and EBO are the best with respect to number of memory accesses. When B=72, EPO was superior to EBO by 1 memory access on 2 of the 7 data sets and tied on the remaining 5. However, when B=144, EBO was superior to EPO by 1 memory accesses on 3 of the 7 data sets and tied on the remaining 4. As with the IPv4 data, the memory utilization of the EBO structures is almost as good as of the EPO structures (an average difference of 1%). Worst-case lookups in the constructed BFP structures require 1.14 to 2.00 times as many memory accesses as required in the EBO structures and the BFP structures require 1.82 to 3.17 times the memory required by the EBO structures.

As was the case for the IPv4 experiments, increasing B from 72 to 144, results in a reduction in the number of memory accesses required for a lookup. For EPO the maximum, minimum, and average reduction in the number of memory accesses were 33%, 17%, and 25%; the standard deviation was 8%. The corresponding percentages for EBO were 57%, 20%, 34%, and 13%. The memory required by EPO decreased for 5 of the 7 data sets while it increased on the remaining 2. The total memory required when B=144 normalized by that required when B=72 was between 0.86 and 1.1; the average and standard deviation were 1.01 and 0.1, respectively. For EBO, the memory required decreased on all of the 7 data sets. The maximum, minimum, and average memory reduction were 16%, 4%, and 12%; the standard deviation was 4%.

Further Optimizations

Song, et al. have proposed two techniques: child promotion and nearest-ancestor collapse, that may be used to reduce the number of nodes and number of prefixes in the one-bit binary tree. These techniques reduce the size of the one-bit binary trie as well as that of its compact representation. In child promotion, the prefix stored in a binary node is promoted, if its sibling also contains a valid prefix, to the parent node. After the promotion, the node is deleted provided it is a leaf. In the nearest ancestor collapse technique, the prefix stored in a node is eliminated if its nearest ancestor contains a prefix with the same next hop; leaves are deleted if they become empty. Note that nearest-ancestor collapse is very similar to the port merge technique proposed by Sun, et al. A port merge is used to reduce the number of endpoints by merging two consecutive destination-address intervals that have the same next hop.

In this section, the effect of child promotion and nearest-ancestor collapse on the succinct representations generated by EBO, BFP, and V3MT will be studied. For V3MT, a port merge is done on the intervals constructed from the optimized binary trie. For this experimental study, only 3 of the IPv4 data sets—Aads, Maewest, and AS1221 are used as these are the only data sets for which next-hop data is available.

FIG. 22 gives the total memory requirement and memory accesses needed for a lookup. EBO remains the best succinct representation method on both the number of memory accesses measure and the total memory measure. On 2 of the 18 tests, (BFP on AS1221 with B=144 and V3MT on Aads with B=72), the number of memory accesses required for a lookup is reduced by 1. For the remaining 16 tests, there is no change in the number of accesses required for a lookup.

The application of the child promotion and nearest-ancestor collapse optimizations reduces the total memory required by the succinct representations of the binary trie. For EBO, the reduction varies from 24% to 35% with the mean reduction being 29%; the standard deviation is 5%. For BFP, these percentages were 23%, 37%, 28% and 6%. These percentages for V3MT were 34%, 49%, 40%, and 7%. The experiments indicate that most of the reduction in memory requirement is due to the nearest-ancestor collapse optimization. Child promotion contributed around 1% of the memory reduction.

The memory required by the BFP structures normalized by that required by the EBO structures was between 1.41 and 1.82, with the mean and standard deviation being 1.62 and 0.17. The corresponding ratios for V3MT were 1.02, 1.40, 1.19 and 0.16.

Multi-Dimensional IPv4 Tables

The performance of the proposed data structures using both 2-dimensional and 5-dimensional data sets is evaluated. Twelve 5-dimensional data sets that were created by the filter generator of Taylor, et al. are used. Each of these data sets actually has 10 different databases of rules. So, in all, there are 120 databases of 5-dimensional rules. The data sets, which are named ACL1 through ACL5 (Access Control List), FW1 through FW5 (Firewall), IPC1 and IPC2 (IP Chain) have, respectively, 20K, 19K, 19K, 19K, 12K, 19K, 19K, 18K, 17K, 17K, 19K, and 20K rules, on average, in each database. The 2-dimensional data sets, which were derived from these 5-dimensional data sets, have, respectively, 20K, 19K, 10K, 13K, 5K, 19K, 19K, 18K, 17K, 17K, 16K and 20K rules on average in each database. The 2-dimensional rules were obtained from the 5-dimensional rules by stripping off the source and destination port fields as well as the protocol field; the dest and source prefix field were retained. Following this stripping process, duplicates were deleted (i.e., two rules are considered duplicate if they have the same dest prefix and the same source prefix).

Two-Dimensional IPv4 Tables

Figure 24:
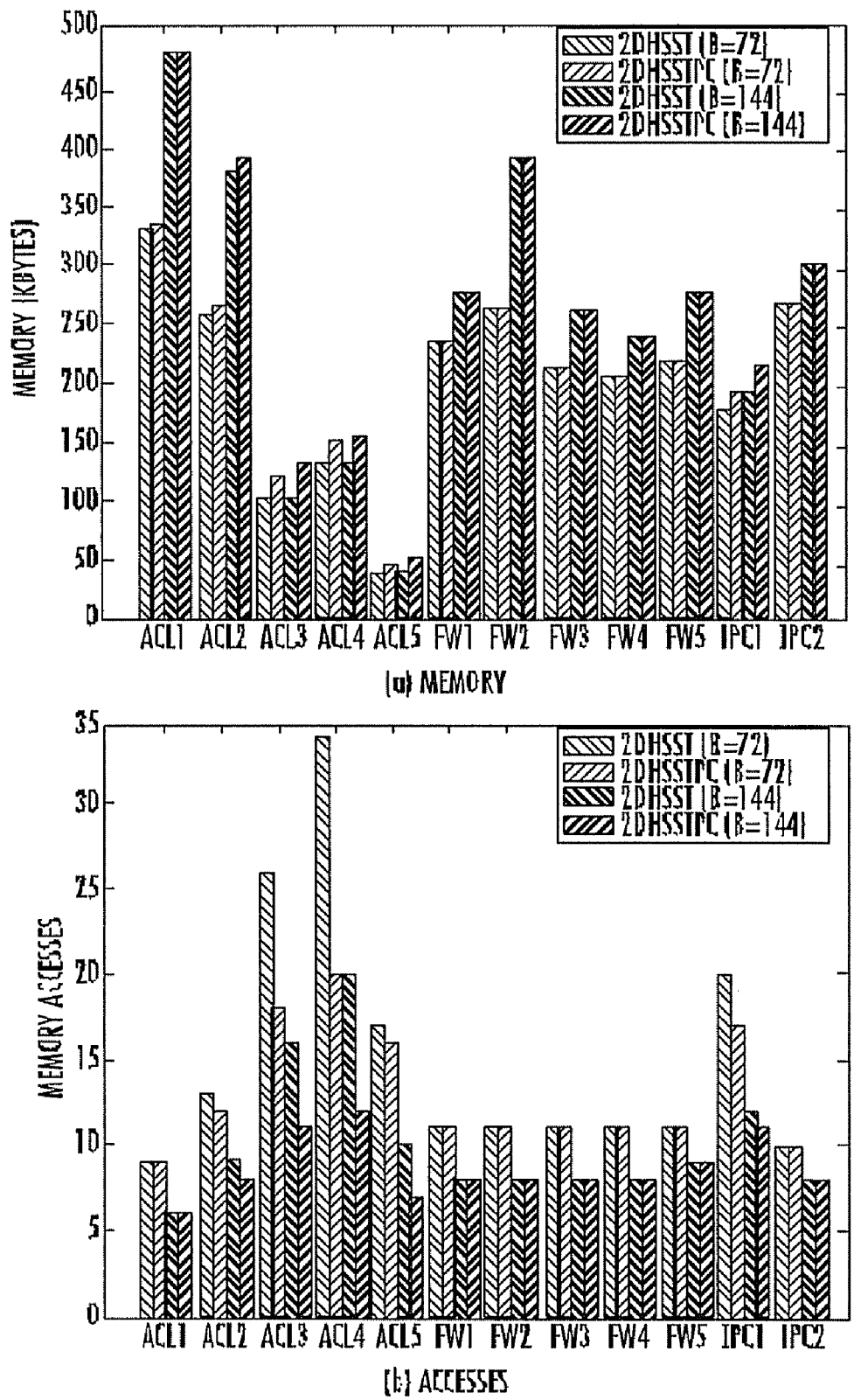
FIG. 24 is a graphical representation of the total memory required by 2DHSSTs and 2DHSSTPCs of the invention.

First, the space-optimal minimum-access 2DHSST and 2DHSSTPC structures are compared. FIGS. 23 and 24 show the results from the experiment. For 5 of the 12 data sets—ACL2-5, and IPC1-2DHSSTPCs reduce the number of accesses at the expense of increased memory requirement. For the remaining data sets, 2DHSSTPCs and 2DHSSTs require almost the same number of accesses and the same amount of memory.

Across all the data sets, 2DHSSTPCs required between 0% and 29% more memory than required by 2DHSSTs (the mean increase in memory required was 6% and the standard deviation was 9%). As noted earlier, although 2DHSSTPCs required more memory, they required a smaller number of memory accesses for a lookup. The reduction in number of memory accesses a_ordered by 2DHSSTPCs was between 0% and 41% (the mean reduction was 11% and the standard deviation was 13%).

When B is increased from 72 to 144, for both 2DHSSTs and 2DHSSTPCs, the number of memory accesses required is reduced, but the total memory required is generally increased. For 2DHSSTs, the total memory required when B=144 normalized by that required when B=72 is between 0.98 and 1.50 (the mean and the standard deviation are 1.21 and 0.19); the number of memory accesses reduces by between 28% and 41% (the mean reduction is 30% and the standard deviation is 9%). For 2DHSSTPCs, the normalized memory requirement is between 1.04 and 1.49 (the mean and standard deviation are 1.23 and 0.16); the reduction in number of memory accesses ranges from 18% to 56% (the mean reduction and the standard deviation are 31% and 11%)

Since the primary objective is to reduce the number of memory accesses, 2DHSSTPCs with B=144 for further benchmarking with 2DMTSas and 2DMTds are used. The 2DMTSas and 2DMTds used the compression techniques packed array and butler node. These two techniques are very similar; both attempt to replace a subtrie with a small amount of actual data (prefixes and pointers) by a single node that contains these data. It is noted that 2DMTds and 2DMTSas are the best of the structures developed, and using these two compression techniques, Lu, et al. have established the superiority of 2DMTds and 2DMTSas over other competing packet classification structures such as Grid-of-Tries, EGT-PCs, and HyperCuts. For this further benchmarking, space-optimal 2DHSSTPCs with the minimum possible number, H, of memory accesses for a worst-case search are constructed. This minimum H was provided as input to the 2DMTSa (2DMTd) algorithm to construct a 2DMTSa (2DMTd) that could be searched with H memory accesses in the worst case. Because of this strategy, the worst-case number of memory accesses for 2DHSSTPCs and 2DMTSas (2DMTd) is the same.

Figures 25, 26:
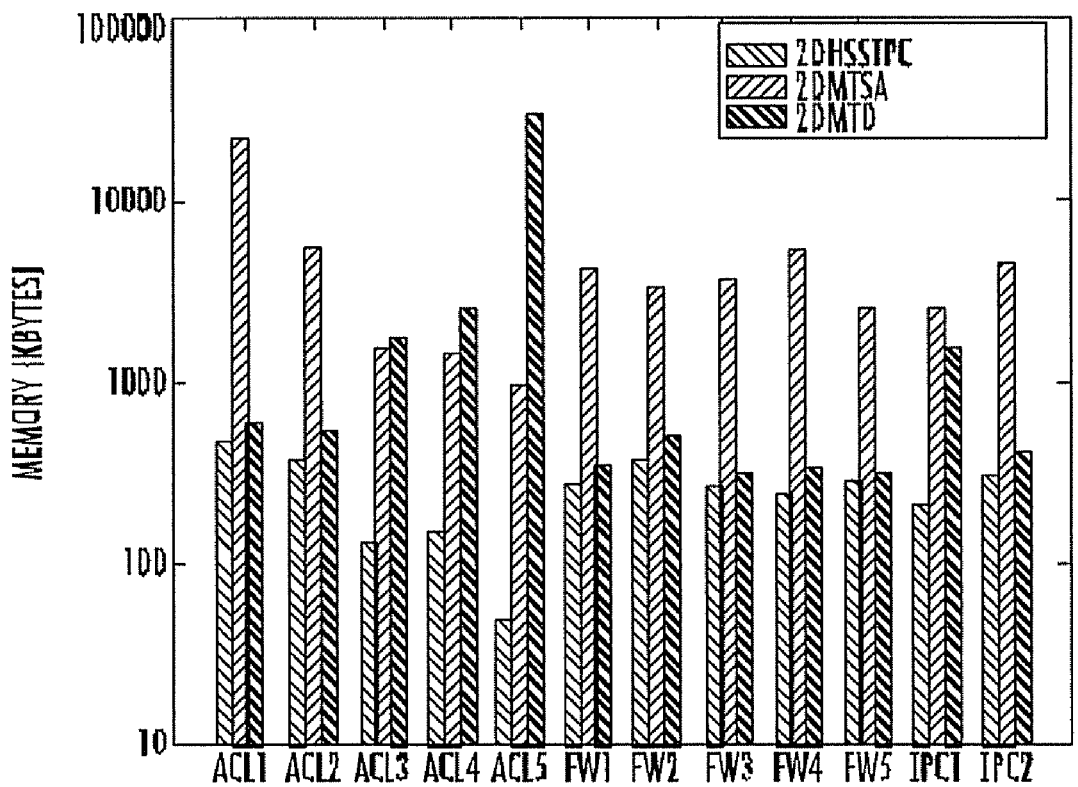
FIG. 25 is a graphical representation of the number of memory accesses for a 2D lookup performed according to a particular embodiment of the invention.
FIG. 26 is a table of the total memory required by 2DHSST-PCs, 2DMTds, and Grid-of-Tries.

FIG. 25 plots the memory required by 2DHSSTPCs, 2DMTds, and 2DMTSas. It can be seen that on the memory criterion, 2DHSSTPCs outperform 2DMTSas by an order of magnitude, and outperform 2DMTSas by an order of magnitude on 4 of our 12 data sets. The memory required by 2DMTds normalized by that required by 2DHSSTPCs is between 1.14 and 624, the mean and standard deviation being 56 and 179. The normalized numbers for 2DMTSas were 9, 49, 17, 11. It is also observed that when 2DMTds are given up to 60% more memory than required by space-optimal DHSSTPCs with the minimum possible H, 2DMTds that can be searched with 1 or 2 fewer accesses for the data sets FW1-5 and IPC2 can be constructed.

Five-Dimensional IPv4 Tables

For 5-dimensional tables, 2DHSSTPCs are extended using the bucket scheme proposed in Baboescu et al. ("Packet classification for core routers: is there an alternative to CAMs?," INFOCOM, 2003). Start with a 2-dimensional trie for the destination and source prefixes. All rules that have the same dest-source prefix pair (dp, sp) are placed in a bucket that is pointed at from the appropriate source trie node of the 2-dimensional trie. Since dp and sp are defined by the path to this bucket, the dest and source prefix fields are not stored explicitly in a bucket. However, the source port range, dest port range, protocol type, priority and action are stored for each rule in the bucket. The 2DHSSTPC algorithms of this paper are used to obtain a supernode representation of the 2-dimensional trie and the NH lists of next-hop data are comprised of buckets. SuffixB nodes (an end-node optimization proposed in Lu, et al.) are modified so that they contain source prefix suffixes, dest and source ports, protocols, priorities and actions rather than just source prefix suffixes, priorities and actions. During prefix inheritance in 2DHSSTPCs, a source trie may inherit prefixes, from its ancestor tries, that already are in that source trie. When this happens, the rules associated with these inherited prefixes need also to be stored in this source trie. To avoid this redundancy, a pointer is stored in the bucket associated with a source-trie prefix, which points to the bucket associated with the same prefix in the nearest ancestor source trie. 2DHSSTPCs with buckets are called extended 2DHSSTPCs. Unlike 2DHSSTs, the source tries of an extended 2DHSSTPC are not modified so that the last source prefix seen on a search path has highest priority (or least cost).

Baboescu, et al. state that when 2-dimensional tries with buckets are used, as above, for 5-dimensional tables, most buckets have no more than 5 rules and no bucket has more than 20 rules. While this observation was true of the data sets used in Baboescu et al., some buckets had significantly more rules for our data sets. For example, in FW4, about 100 rules contain wildcards in both the dest and source prefix fields. These rules may be removed from the original data set and stored in a search structure that is optimized for the remaining 3 fields. It is noted that this strategy of storing a large cluster of rules with wildcards in the dest and source prefix fields in a separate structure was used earlier in the HyperCuts scheme. The data reported in the following figures and tables are only for structures constructed for the rules that remain after rules with wildcards in both dest and source prefix fields are removed.

Figure 27:
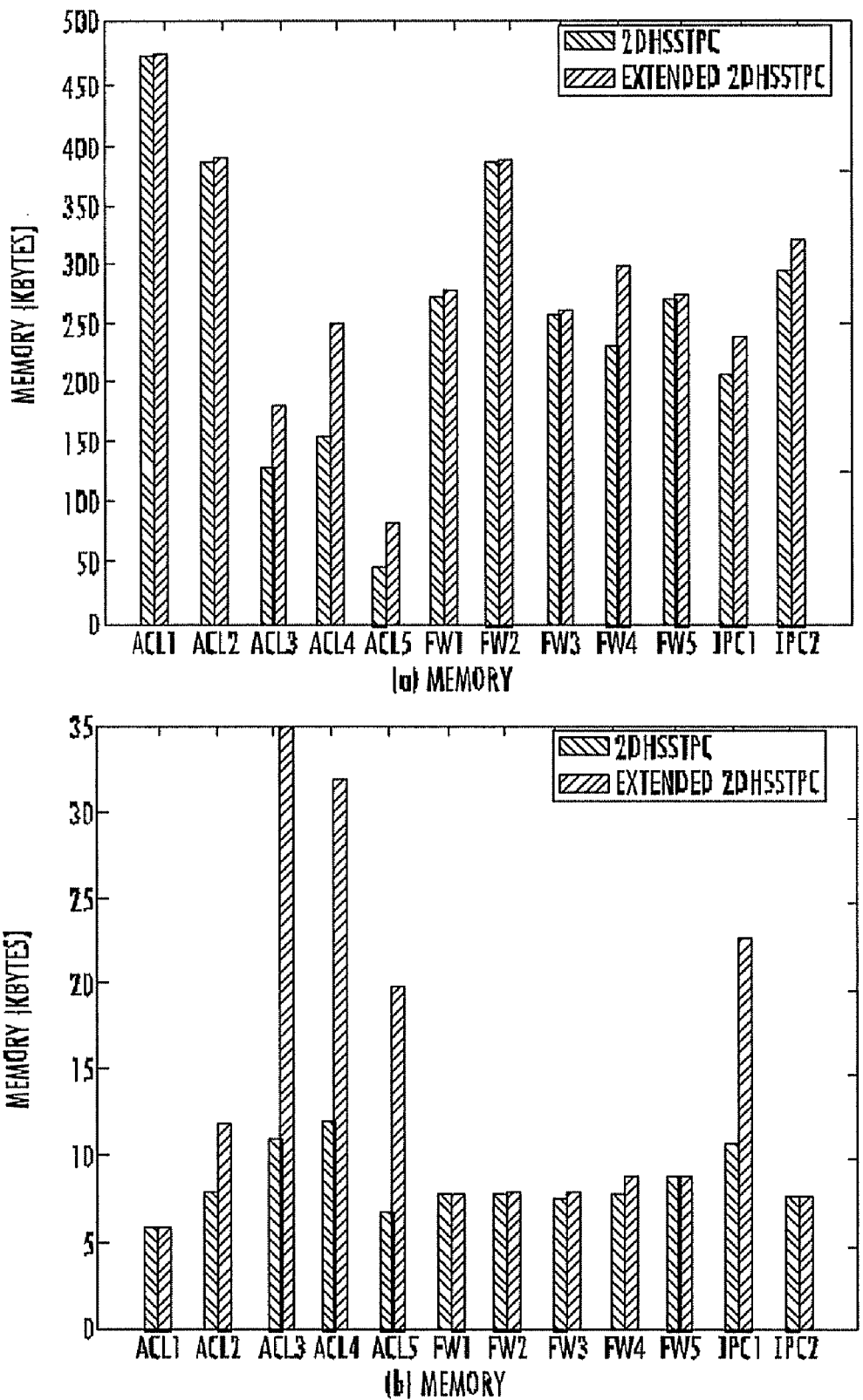
FIGS. 27(a) and (b) are tables of total memory (KBytes) and number of memory accesses required, respectively, by 2DHSSTPCs and extended 2DHSSTPCs of the invention.

FIG. 26 gives the total memory and number of memory accesses required by extended 2DHSSTPCs on the twelve 5-dimensional data sets. FIG. 27 compares 2DHSSTPCs (these, of course, store only the derived 2-dimensional rules) with extended 2DHSSTPCs that store 5-dimensional rules. The number of bits per rule required Memory (KBytes) by extended 2DHSSTPCs was between 59 and 196; the average was 128. Surprisingly, the addition of three fields increased the number of bits/rule by between 0.5 and 42 only; the average increase was only 13. In fact, for 8 of the 12 data sets (ACL1-2, FW1-5, and IPC2), extended 2DHSSTPCs and 2DHSSTPCs (both using B=144), required almost the same number of bits/rule. The very small increase in bits/rule is due to (a) port ranges in very many of our rules are wildcards that need only a bit each and (b) most of the data for the 3 additional fields in 5-dimensional rules can be packed into space in SuffixB nodes that is wasted in the case of 2-dimensional rules. The number of memory accesses required to search the extended 2DHSSTPCs ranged from 6 to 35; the average was 15. For 6 of our 12 data sets (ACL1, FW1-3, FW4, and IPC2), there was no increase in the number of memory accesses required for a lookup in an extended 2DHSSTPC for a particular 5-dimensional data set versus a lookup in the 2DHSSTPC for the corresponding 2-dimensional data set.

HyperCuts reported in Singh, et al., above, which is one of the previously known algorithmic schemes for multidimensional packet classification, uses a decision tree and rules are stored in buckets of bounded size; each bucket is associated with a tree node. Unlike the bucket scheme used by extended 2DHSSTPCs in which the dest and source prefixes are not stored explicitly, the bucket scheme of HyperCuts requires the storage of these fields as well as those stored in extended 2DHSSTC buckets. So, the storage of an individual rule in HyperCuts requires more space than is required in extended 2DHSSTPCs. Additionally, in HyperCuts, a rule may be stored in several buckets whereas in extended 2DHSSTPCs, each rule is stored in exactly 1 bucket. The most efficient Hypercut scheme is HyperCuts-4. This scheme is used for comparison with extended 2DHSSTPCs.

FIG. 28 shows the total memory and number of memory accesses required by HyperCuts, on the twelve 5-dimensional data sets. The number of bits per rule required by the Hyper-Cuts structure was between 242 and 163,519; the average was 56,801. It is important to note that there is wide variation in the bits/rule required by Hypercuts; the bits/rule required by extended 2DHSSTPCs is far better predictable. In particular, Singh, et al. report that the performance of HyperCuts is not good for firewall-like databases as these tend to have a high frequency of wildcards in the source and/or dest fields. In fact, Singh, et al., above, report that a 10% presence of wildcards in either the source or dest prefix fields resulted in a steep increase in memory requirement. This observation is confirmed by the experiments in the present invention. Hyper-Cuts exhibited its best bits/rule performance on ACL1 and ACL5 (242 and 400, respectively), in which the frequency of wildcards in either the source or dest fields is less than 1%. It exhibited its worst performance on the 5 firewall data sets FW1-5 and on IPC2 (bits/rule ranged from 25,757 to 163,519). The wildcard frequency was between 60% and 90% in these data sets. The remaining data sets (ACL2-4 and IPC1) had a wildcard frequency between 10% and 15% and the bits/rule required by the Hypercuts structure varied from 4,415 to 16,363. The number of accesses required to search the Hypercuts structure for the data sets ranged from 16 to 51, with the average being 30.

Figure 29:
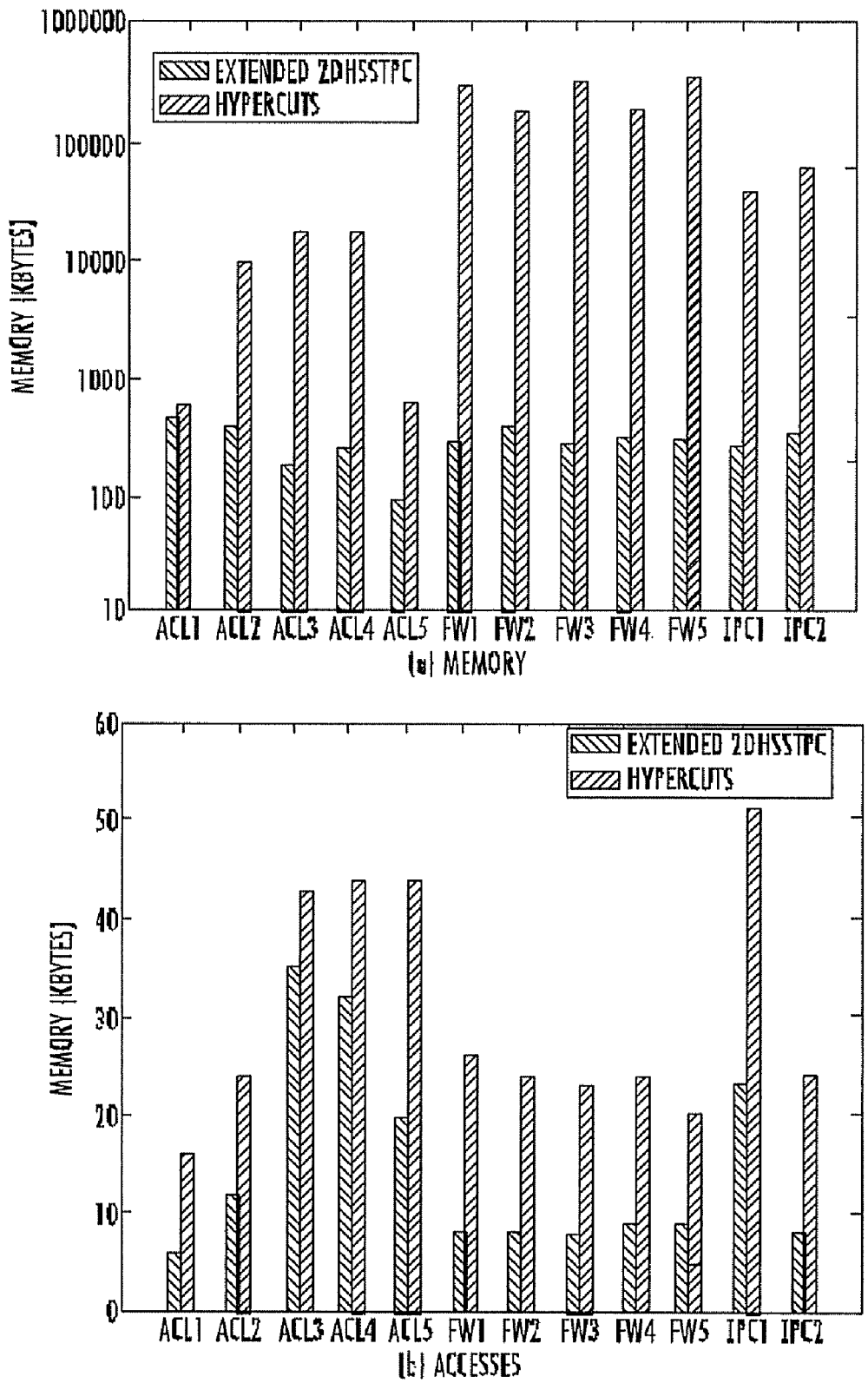
FIGS. 29(a) and (b) are graphical representations of total memory (KBytes) and number of memory accesses required by HyperCuts and extended 2DHSSTPCs, according to a particular embodiment of the invention.

FIG. 29 compares extended 2DHSSTPCs and HyperCuts. The structure constructed by extended 2DHSSTPCs required between 0.1% and 79% the memory required by that constructed by HyperCuts; the average and standard deviation being 8% and 23%, respectively. The number of accesses for a lookup in the extended 2DHSSTPCs structure was between 31% and 81% that required by the HyperCuts structure; the average and standard deviation were 46% and 16%, respectively. For both schemes, the reported memory and accesses are only for the rules that remain after rules with wildcards in both dest and source prefix fields are removed.

Since, in extended 2DHSSTPCs, no rule is stored twice while the same rule may be stored in several Hypercuts buckets (depending on the complexity of the rule set), the memory requirement of 2DHSSTPCs is better predicted and far less on average and worst-case data.

Figure 30:
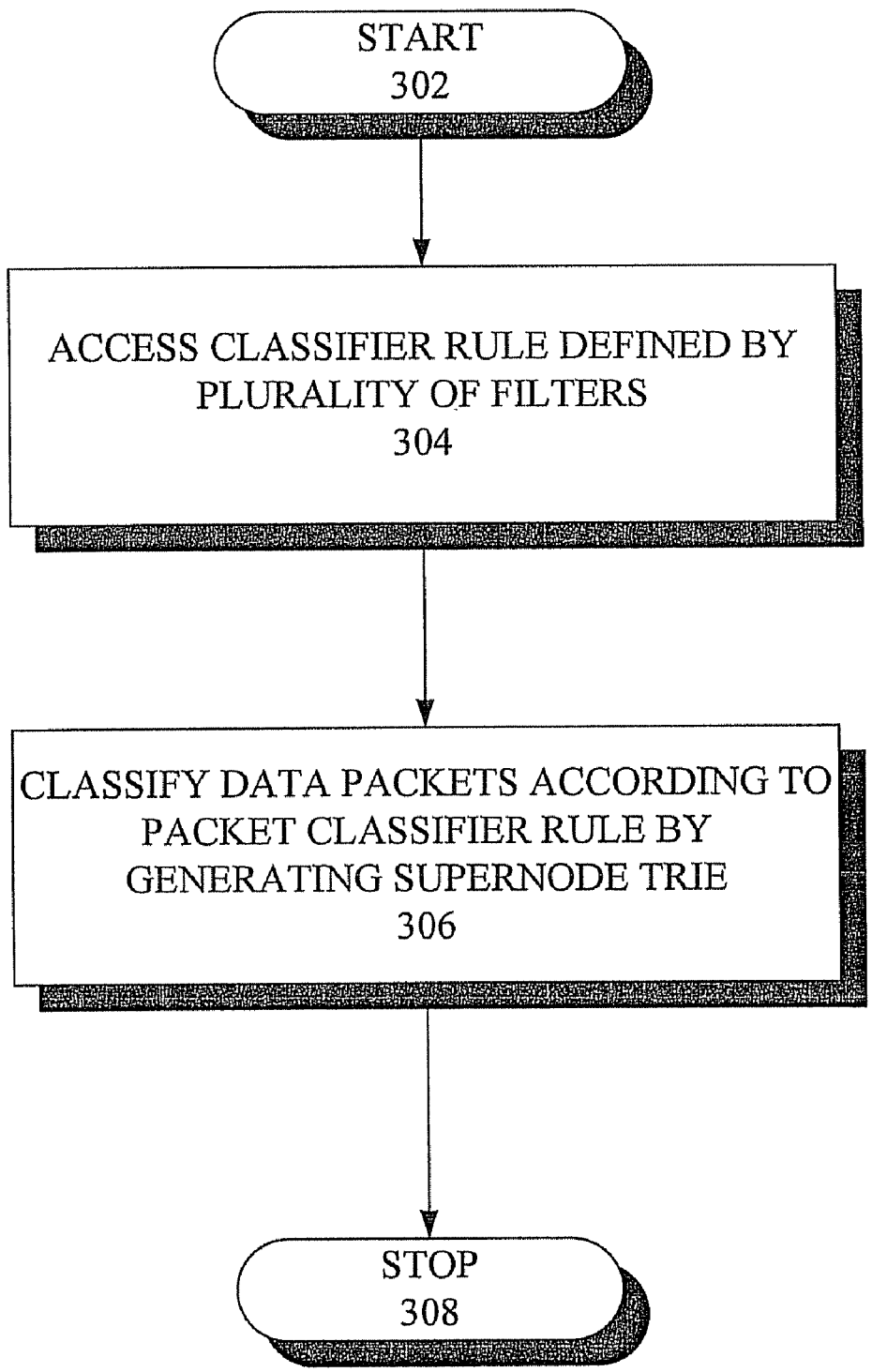
FIG. 30 is a flowchart of exemplary steps of a method for classifying packets of data transmitted over a data communications network, according to a particular embodiment of the invention.

Referring now to FIG. 30, a method 300 for classifying packets of data transmitted over a data communications network is represented by the flowchart of exemplary steps. Illustratively, after initial step 302, a memory-storable packet classifier rule defined by a plurality of filters is provided, at step 304. Each filter uniquely corresponds to one of a plurality of actions to be taken in transmitting the data packets over the data communications network. At step 306, the a data packet is classified according to the packet classifier rule by generating at least one supernode trie subject to a predetermined constraint for reducing accesses to a memory in which the packet classifier rule is stored. The method illustratively concludes at step 308.

According to one embodiment, the generating step 306 comprises generating a 1-dimensional node, space-optimal supernode, wherein the predefined constraint minimizes the memory accesses. According to another embodiment, the generating step 306 comprises generating a multidimensional node, space-optimal supernode, wherein the predefined constraint minimizes the memory accesses. Moreover, the supernode and predefined constraint can be configured to minimize an amount of memory for storing the at least one classifier rule.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention can be embedded in a computer program product, or computer-readable storage medium, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The invention can be embodied in other forms without departing from the spirit or essential attributes thereof. Accordingly, reference should be made to the following claims, rather than to the foregoing specification, as indicating the scope of the invention.

We claim:

1. A computer-implemented method of classifying packets of data transmitted over a data communications network, the method comprising:

providing a memory-storable packet classifier rule defined by a plurality of filters, each filter uniquely corresponding to one of a plurality of actions to be taken in transmitting the data packets over the data communications network; and classifying a data packet according to the packet classifier rule by generating at least one supernode trie subject to a predetermined constraint for reducing accesses to a memory in which the packet classifier rule is stored, wherein generating the at least one supernode trie comprises constructing a minimum height shape-shifting trie (SST) by pruning descendents of a node x in a binary trie T visited during a traversal of T, wherein the pruned descendents of x are mapped into supernodes that form one or more hanging SSTs of the minimum height SST being constructed, the one or more SSTs being left hanging SSTs or right hanging SSTs, wherein constructing the minimum height SST comprises:

comparing a maximum SST height in the left hanging SSTs that hang from x when x is visited to a maximum SST height in the right hanging SSTs that hang from x when x is visited, wherein:

when the maximum SST height in the left hanging SSTs is equal to the maximum SST height in the right hanging SSTs:

if the number of nodes remaining when x is visited is greater than a stride K, pruning T at a left child of x in T by removing the remaining nodes in the left child of x in T; and pruning T at a right child of x in T by removing the remaining nodes in the right child of x in T;

else if the number of nodes remaining when x is visited is equal to K, pruning T at x by removing the remaining nodes of x;

when the maximum SST height in the left hanging SSTs is less than the maximum SST height in the right hanging SSTs:

pruning T at the left child of x in T by removing the remaining nodes in the left child of x in T;

updating a value of the number of nodes remaining in x; and if the value of the number of nodes remaining in x is equal to K, then pruning T at x by removing the remaining nodes of x;

else not pruning T at x;

when the maximum SST height in the left hanging SSTs is greater than the maximum SST height in the right hanging SSTs:

pruning T at the right child of x in T by removing the remaining nodes in the right child of x in T;

updating the value of the number of nodes remaining in x; and if the value of the number of nodes remaining in x is equal to K, then pruning T at x by removing the remaining nodes of x;
else not pruning T at x.

2. A system comprising a combination of hardware and software modules for classifying packets of data transmitted over a data communications network, the system comprising:
a memory for storing at least one packet classifier rule defined by a plurality of filters, each filter uniquely corresponding to a one of a plurality of actions to be taken in transmitting the data packets over the data communications network; and
a processor configured to access the packet classifier rule in the memory and to classify a data packet based upon the packet classifier rule, the data packet being classified by the processor generating at least one supernode trie subject to a predetermined constraint for reducing accesses to the memory,
wherein the processor is configured to generate the at least one supernode trie by constructing a minimum height shape-shifting trie (SST), wherein the constructing of the minimum height SST is performed by pruning descendents of a node x in a binary trie T visited during a traversal of T, wherein the pruned descendents of x are mapped into supernodes that form one or more hanging SSTs of the minimum height SST being constructed, the one or more SSTs being left hanging SSTs or right hanging SSTs, wherein constructing the minimum height SST comprises:
comparing a maximum SST height in the left hanging SSTs that hang from x when x is visited to a maximum SST height in the right hanging SSTs that hang from x when x is visited, wherein:
when the maximum SST height in the left hanging SSTs is equal to the maximum SST height in the right hanging SSTs:
if the number of nodes remaining when x is visited is greater than a stride K,
pruning T at a left child of x in T by removing the remaining nodes in the left child of x in T; and
pruning T at a right child of x in T by removing the remaining nodes in the right child of x in T;
else if the number of nodes remaining when x is visited is equal to K,
pruning T at x by removing the remaining nodes of x;
when the maximum SST height in the left hanging SSTs is less than the maximum SST height in the right hanging SSTs:
pruning T at the left child of x in T by removing the remaining nodes in the left child of x in T;
updating a value of the number of nodes remaining in x; and
if the value of the number of nodes remaining in x is equal to K, then pruning T at x by removing the remaining nodes of x;
else not pruning T at x;
when the maximum SST height in the left hanging SSTs is greater than the maximum SST height in the right hanging SSTs:
pruning T at the right child of x in T by removing the remaining nodes in the right child of x in T;
updating the value of the number of nodes remaining in x; and
if the value of the number of nodes remaining in x is equal to K, then pruning T at x by removing the remaining nodes of x;
else not pruning T at x.

3. A non-transitory computer-readable storage medium for storing a computer program comprising computer-implemented instructions for:
accessing a memory-storable packet classifier rule defined by a plurality of filters, each filter uniquely corresponding to one of a plurality of actions to be taken in transmitting the data packets over the data communications network; and
classifying a data packet according to the packet classifier rule by generating at least one supernode trie subject to a predetermined constraint for reducing accesses to a memory in which the packet classifier rule is stored, wherein generating the at least one supernode trie comprises constructing a minimum height shape-shifting trie (SST) by pruning descendents of a node x in a binary trie T visited during a traversal of T, wherein the pruned descendents of x are mapped into supernodes that form one or more hanging SSTs of the minimum height SST being constructed, the one or more SSTs being left hanging SSTs or right hanging SSTs, wherein constructing the minimum height SST comprises:
comparing a maximum SST height in the left hanging SSTs that hang from x when x is visited to a maximum SST height in the right hanging SSTs that hang from x when x is visited, wherein:
when the maximum SST height in the left hanging SSTs is equal to the maximum SST height in the right hanging SSTs:
if the number of nodes remaining when x is visited is greater than a stride K,
pruning T at a left child of x in T by removing the remaining nodes in the left child of x in T; and
pruning T at a right child of x in T by removing the remaining nodes in the right child of x in T;
else if the number of nodes remaining when x is visited is equal to K,
pruning T at x by removing the remaining nodes of x;
when the maximum SST height in the left hanging SSTs is less than the maximum SST height in the right hanging SSTs:
pruning T at the left child of x in T by removing the remaining nodes in the left child of x in T;
updating a value of the number of nodes remaining in x; and
if the value of the number of nodes remaining in x is equal to K, then pruning T at x by removing the remaining nodes of x;
else not pruning T at x;
when the maximum SST height in the left hanging SSTs is greater than the maximum SST height in the right hanging SSTs:
pruning T at the right child of x in T by removing the remaining nodes in the right child of x in T;
updating the value of the number of nodes remaining in x; and
if the value of the number of nodes remaining in x is equal to K, then pruning T at x by removing the remaining nodes of x;
else not pruning T at x.

4. A computer-implemented method of classifying packets of data transmitted over a data communications network, the method comprising:
classifying a data packet according to a packet classifier rule stored in a memory and defined by a plurality of filters, each filter uniquely corresponding to one of a plurality of actions to be taken in transmitting the data packets over the data communications network, wherein the classifying the data packet is performed by generating at least one supernode trie subject to a predetermined constraint for reducing accesses to a memory in which the packet classifier rule is stored, wherein generating the at least one supernode trie comprises:

constructing a space optimal hybrid shape shifting trie (HSST) having tree bitmap (TBM) supernodes with a TBM stride S and shape shifting trie (SST) supernodes with a SST stride K, where opt(N, h) provides a number of supernodes in the space optimal HSST, where N is a node of a binary trie T and h is a maximum feasible height of the HSST, where opt(N, h, k) is a number of supernodes in the space optimal HSST for a subtree of T rooted at N, where a root of the space optimal HSST is an SST supernode for k number of nodes of the subtree of T rooted at N wherein constructing the space optimal HSST comprises:

computing $$opt(N, h) = \min\left\{1 + \sum_{R \in D_S(N)} opt(R, h-1), \min_{0 < k \leq K} \{opt(N, k)\}\right\},$$

where $D_S(N)$ are descendents in T of N that are at level S of the subtree of T rooted at N.

5. The method according to claim 4, wherein opt(N, h, k)=f(N, h, k) for h>0 and k>0, where f(N, h, k) is the number of supernodes in the space-optimal HSST, where N is not the root of T, where the root of the HSST is an SST supernode having utilization of k+1 and a maximum height of h, and where N has one of 0, 1, and 2 children, the method further comprising computing a recurrence for opt(N, h, k), wherein:

when N has no child, opt(*N*,*h*,*k*)=1;

when N has only one child a, opt(*N*,*h*,*k*)=f(a,h,k−1); and when N has two children a and b, $$opt(N, h, k) = \min_{0 < j \leq k} \{f(a, h, j) + f(b, h, k - j - 1) - 1\}.$$

6. A system comprising a combination of hardware and software modules for classifying packets of data transmitted over a data communications network according to the method of claim 5, the system comprising:
a memory for storing at least one packet classifier rule defined by the plurality of filters; and
a processor configured to access the packet classifier rule in the memory and to perform the method of claim 5.

7. A non-transitory computer-readable storage medium for storing a computer program comprising computer-implemented instructions for performing the method of claim 5.

8. A system comprising a combination of hardware and software modules for classifying packets of data transmitted over a data communications network according to the method of claim 4, the system comprising:
a memory for storing at least one packet classifier rule defined by the plurality of filters; and
a processor configured to access the packet classifier rule in the memory and to perform the method of claim 4.

9. A non-transitory computer-readable storage medium for storing a computer program comprising computer-implemented instructions for performing the method of claim 4.

10. A computer-implemented method of classifying packets of data transmitted over a data communications network, the method comprising:
classifying a data packet according to a packet classifier rule stored in a memory and defined by a plurality of filters, each filter uniquely corresponding to one of a plurality of actions to be taken in transmitting the data packets over the data communications network, wherein the classifying the data packet is performed by generating at least one supernode trie subject to a predetermined constraint for reducing accesses to a memory in which the packet classifier rule is stored, wherein generating the at least one supernode trie comprises:
constructing a space optimal two-dimensional hybrid shape shifting trie (2DHSST), the space optimal 2DHSST having a top-level binary trie and at least one lower-level binary trie comprising tree bitmap (TBM) supernodes with a TBM stride S and shape shifting trie (SST) supernodes with a SST stride K, where opt1(N, h) provides a number of supernodes in the space optimal 2DHSST for a two-dimensional binary trie (2DBT) rooted at N, where N is a node of a 2DBT T and h is a maximum number of memory accesses per look-up, wherein constructing the space optimal 2DHSST comprises:
when a root of the 2DHSST is a TBM supernode having a stride S=q, where q>0, computing:

$$g(N, q, h) = \min_{m(N) \leq i \leq h} \{g(LC(N), q-1, h-i) + g(RC(N), q-1, h-i) + s(N, i)\},$$

where g(N,q,h)+1 is a size of the space optimal 2DHSST for the 2 DBT rooted at N, m(N) is a minimum possible value of a maximum number of memory accesses (MNMA) required to search a source HSST of the 2DHSST of a source trie that hangs from the node N, LC(N) is a left child in T of N, RC(N) is a right child in T of N, and s(N,i) is a size of a space optimal HSST for the source trie that hangs from the node N, and when the root of the 2DHSST is an SST supernode, computing:

$$opt1(N, h) = \min\left\{g(N, S, h) + 1, \min_{0 < k \leq K} \{opt1(N, h, k)\}\right\},$$

where opt1(N, h, k) is a number of supernodes in the space optimal 2DHSST for the 2DBT rooted at N, and k is a utilization of the SST supernode.

11. The method according to claim 10, wherein the root of the 2DHSST is an SST supernode having a utilization k+1, where h>0 and k>0, and where N has one of 0, 1, and 2 children, the method further comprising computing opt1(N, h, k), wherein:

when N has no child, opt1(*N*,*h*,*k*)=1+s(*N*,*h*−1);

when N has only one child a, $$opt1(N, h, k) = \min_{m(N) \leq i \leq h} \{f(a, h-i, k-1) + s(N, i)\};$$

and when N has two children a and b, $$opt1(N, h, k) = \min_{m(N) \le i < h} \left\{ \min_{0 \le j < k} \{f(a, h-i, j) + f(b, h-i, k-j-1) - 1\} + s(N, i) \right\},$$

where f(N, h, k) is a number of supernodes in the space optimal 2DHSST for the 2 DBT rooted at N and the parent in T of N, but excluding any lower-level source trie that hangs from N.

12. A system comprising a combination of hardware and software modules for classifying packets of data transmitted over a data communications network according to the method of claim 11, the system comprising:
   a memory for storing at least one packet classifier rule defined by the plurality of filters; and
   a processor configured to access the packet classifier rule in the memory and to perform the method of claim 11.

13. A non-transitory computer-readable storage medium for storing a computer program comprising computer-implemented instructions for performing the method of claim 11.

14. A system comprising a combination of hardware and software modules for classifying packets of data transmitted over a data communications network according to the method of claim 10, the system comprising:
   a memory for storing at least one packet classifier rule defined by the plurality of filters; and
   a processor configured to access the packet classifier rule in the memory and to perform the method of claim 10.

15. A non-transitory computer-readable storage medium for storing a computer program comprising computer-implemented instructions for performing the method of claim 10.

16. A computer-implemented method of classifying packets of data transmitted over a data communications network, the method comprising:
   classifying a data packet according to a packet classifier rule stored in a memory and defined by a plurality of filters, each filter uniquely corresponding to one of a plurality of actions to be taken in transmitting the data packets over the data communications network, wherein
   the classifying the data packet is performed by generating at least one supernode trie subject to a predetermined constraint for reducing accesses to a memory in which the packet classifier rule is stored, wherein generating the at least one supernode trie comprises:
   constructing a space optimal two-dimensional hybrid shape shifting trie with prefix inheritance (2DHSSTP) with a maximum number h of memory accesses per look-up, the space, optimal 2DHSSTP having a top-level binary trie and at least one exit trie comprising tree bitmap (TBM) supernodes with a TBM stride S and shape shifting trie (SST) supernodes with a SST stride K, where each exit trie is a minimum height HSST,
   where opt2(N, h) provides a number of supernodes in the space optimal 2DHSSTP for a subtree of a two-dimensional binary trie (2DBT) T rooted at N, where N is a node of the top-level binary trie, wherein constructing the space optimal 2DHSSTP comprises:
   when a root of the 2DHSSTP is a TBM supernode, computing:

$$opt2(N, h) = 1 + ss(N) + \sum_{R \in D_S(N)} opt2(R, h - 1 - h(R)),$$

where $D_S(N)$ are descendents in T of N that are at level S of the subtree of T rooted at N, where ss(N) is a sum of sizes of the minimum height HSSTS of each of the exit tries of the root TBM supernode, and where h(R) is the maximum number of memory accesses (MNMA) for a last exit trie of the root TBM supernode that is on a path to R, and when the root of the 2DHSSTP is an SST supernode, computing:

$$opt2(N, h) = \min_{0 < k \le K} \{opt2(N, h, k, 0)\},$$

where opt2(N, h, k, p) is a number of supernodes in the space optimal 2DHSSTP for the sub tree of T rooted at N, k is a utilization of the SST supernode, and p is a number of nearest ancestors of N in T.

17. The method according to claim 16, further comprising:
   computing s(N,p) and h(N,p), where if N has a non-empty source trie, then s(N,p) is a size of a space-optimal minimum-height HSST for the union of the source tries that hang off of N and its p nearest ancestors in T, and h(N,p) is the MNMA for the space-optimal minimum-height HSST, else s(N,p)=h(N,p)=0, and where N has one of 0, 1, and 2 children; and
   computing a recurrence for opt2(N, h, k, p) and x(N, h, k, p), wherein:
   when N has no child, $$opt2(N, h, k, p) = \begin{cases} \infty & \text{if } k < 1 \text{ or } h < h(N, p) \\ 1 + s(N, p) & \text{otherwise} \end{cases}$$

$$x(N, h, k, p) = \begin{cases} \infty & \text{if } k < 1 \text{ or } h < h(N, p) \text{ or } N \text{ has an empty source trie} \\ opt2(N, h, k, p) & \text{otherwise;} \end{cases}$$

when N has only one child a, $$opt2(N, h, k, p) = \begin{cases} 1 + opt2(a, h - 1 - h(N, P)) + s(N, p) & \text{if } k = 1 \\ opt2(a, h, k - 1, p + 1) + s(N, p) & \text{otherwise} \end{cases}$$

$$x(N, h, k, p) = \begin{cases} \infty & \text{if } k < 1 \text{ or } h < h(N, p) \text{ or } \\ & N \text{ has an empty source trie} \\ opt2(N, h, k, p) & \text{otherwise;} \end{cases}$$

when N has two children a and b, $$opt2(N, h, k, p) = \begin{cases} 1 + opt2(a, h-1-h(N, p)) + & \text{if } k = 1 \\ opt2(b, h-1-h(N, p)) + s(N, p) \\ \min\{opt2(a, h-1-h(N, p)) + & \text{otherwise,} \\ opt2(b, h, k-1, p+1) + s(N, p), \\ opt2(a, h, k-1, p+1) + \\ opt2(b, h-1-h(N, p)) + s(N, p), \\ \min_{0 < j < k-1}\{opt2(a, h, j, p+1) + \\ opt2(b, h, k-j-1, p+1)\} - 1 + s(N, p), \\ \text{min}x(N, h, k, p)\} \end{cases}$$

where $\text{min}x(N, h, k, p) =$ $$\min_{0 < j \le k-1} \{x(a, h, j, p+1) + x(b, h, k-j-1, p+1)\} - 1,$$

$$x(N, h, k, p) = \begin{cases} \text{min}x(n, h, k, p) & \text{if } N \text{ has an empty source trie} \\ opt2(N, h, k, p) & \text{otherwise,} \end{cases}$$

where x(N, h, k, p) is a number of supernodes in the space optimal 2DHSSTP when the root of the 2DHSSTP is a dominating node.

18. The method according to claim 17, wherein computing s(N,p) comprises computing $$opt(N, h) = \min\left\{1 + \sum_{R \in D_S(N)} opt(R, h-1), \min_{0 < k \le K}\{opt(N, h, k)\}\right\},$$

where $D_S(N)$ are descendents in the HSST hanging off of N that are at level S.

19. A system comprising a combination of hardware and software modules for classifying packets of data transmitted over a data communications network according to the method of claim 17, the system comprising:
   a memory for storing at least one packet classifier rule defined by the plurality of filters; and
   a processor configured to access the packet classifier rule in the memory and to perform the method of claim 17.

20. A non-transitory computer-readable storage medium for storing a computer program comprising computer-implemented instructions for performing the method of claim 17.

21. A system comprising a combination of hardware and software modules for classifying packets of data transmitted over a data communications network according to the method of claim 16, the system comprising:
   a memory for storing at least one packet classifier rule defined by the plurality of filters; and
   a processor configured to access the packet classifier rule in the memory and to perform the method of claim 16.

22. A non-transitory computer-readable storage medium for storing a computer program comprising computer-implemented instructions for performing the method of claim 16.

* * * * *

UNITED STATES PATENT AND TRADEMARK OFFICE
CERTIFICATE OF CORRECTION

| | | |
|---|---|---|
| PATENT NO. | : 7,948,980 B2 | Page 1 of 2 |
| APPLICATION NO. | : 12/375623 | |
| DATED | : May 24, 2011 | |
| INVENTOR(S) | : Wencheng Lu and Sartaj Sahni | |

It is certified that error appears in the above-identified patent and that said Letters Patent is hereby corrected as shown below:

Column 1,
Line 12, Insert new paragraph:

--GOVERNMENT SUPPORT
This invention was made with government support under NSF Grant No. ITR-0326155 awarded by the National Science Foundation. The government has certain rights in the invention.--.

Column 3,
Line 66, "Note than the" should read --Note that the--.

Column 9,
Line 25, "nothing to proven" should read --nothing proven--.
Line 29, "If x.size$\geq$K," should read --If x.size>K,--.
Line 32, "y.ht=x.lht x.rht=x.ht" should read --y.ht = x.lht = x.rht = x.ht--.

Column 11,
Line 11, "$0 <j \leq K$" should read --$0 \leq j \leq k$--.

Column 16,
Lines 20-21, "time is need" should read --time is needed--.

Column 18,
Line 31, "paired bis" should read --paired $b_i$s--.

Column 21,
Line 51, "is nit available" should read --is not available--.

Signed and Sealed this
Sixteenth Day of August, 2011

David J. Kappos
*Director of the United States Patent and Trademark Office*

Column 31,
Line 22, "$\{opt(N, k)\}\}$," should read --$\{opt(N,h,k)\}\}$,--.

Column 34,
Line 57, "$h(N, P))$" should read --$h(N, p))$--.